(12) United States Patent
Fettig et al.

(10) Patent No.: US 7,571,113 B2
(45) Date of Patent: Aug. 4, 2009

(54) METHOD AND APPARATUS FOR PROVIDING INTEGRATED MANAGEMENT OF POINT-OF-SALE AND ACCOUNTS RECEIVABLE

(75) Inventors: Brian K. Fettig, Bismarck, ND (US); Jay N. Schlenker, Bismarck, ND (US); Paul F. Fitterer, Bismarck, ND (US); Varsha A. Kumar, Bismarck, ND (US); Mark O. Momerak, Bismarck, ND (US); Brent Roberts, St. Peters, MO (US); Todd Mayfield, St. Peters, MO (US); Jeannine McConnell, Troy, MO (US); Eric Burke, O'Fallon, MO (US)

(73) Assignee: National Information Solutions Cooperative, Inc., Lake St. Louis, MO (US)

( * ) Notice: Subject to any disclaimer, the term of this patent is extended or adjusted under 35 U.S.C. 154(b) by 1046 days.

(21) Appl. No.: 10/708,013

(22) Filed: Feb. 2, 2004

(65) Prior Publication Data
US 2005/0171853 A1 Aug. 4, 2005

(51) Int. Cl.
*G06Q 20/00* (2006.01)
(52) U.S. Cl. ............... 705/16; 715/762; 715/744; 715/780; 715/200; 707/116
(58) Field of Classification Search ................ None
See application file for complete search history.

(56) References Cited

U.S. PATENT DOCUMENTS

| | | | |
|---|---|---|---|
| 5,101,352 A * | 3/1992 | Rembert ................ 705/8 |
| 5,666,493 A | 9/1997 | Wojcik et al. | |
| 5,696,906 A | 12/1997 | Peters et al. | |
| 5,884,284 A | 3/1999 | Peters et al. | |
| 5,924,077 A | 7/1999 | Beach et al. | |
| 6,317,490 B1 | 11/2001 | Cameron et al. | |
| 6,337,901 B1 | 1/2002 | Rome et al. | |
| 6,519,571 B1 | 2/2003 | Guheen et al. | |
| 6,597,773 B2 | 7/2003 | Stanton et al. | |
| 6,965,668 B2 * | 11/2005 | Clark et al. ............. 379/116 |
| 6,973,580 B1 * | 12/2005 | Carroll et al. ............. 726/4 |
| 7,120,677 B1 * | 10/2006 | Berger et al. ............ 709/219 |
| 2001/0023414 A1 * | 9/2001 | Kumar et al. ............ 705/35 |
| 2001/0032106 A1 * | 10/2001 | Smith et al. ............. 705/7 |
| 2001/0056362 A1 * | 12/2001 | Hanagan et al. ......... 705/7 |
| 2002/0013728 A1 | 1/2002 | Wilkman | |

(Continued)

OTHER PUBLICATIONS

"An Environment for the Organised Construction of User-Interfaces to Databases" by Kenneth J Mitchell and Jessie B Kennedy Published by Napier University, 1996.*

*Primary Examiner*—F. Zeender
*Assistant Examiner*—Luna Champagne
(74) *Attorney, Agent, or Firm*—Mark E. Stallion; Husch Blackwell Sanders LLP

(57) ABSTRACT

A system and method for providing integrated customer care, managing complex data relating to services and presenting information for selection and interaction by end users. The present invention delivers, tracks, presents and manages various aspects of customer care using a customer centric paradigm. An integrated macro-framework is utilized to provide a consistent and efficient single-point of entry GUI tool for accessing and navigating through various displays relating to the processing of data, reports, billing, work-flows, service orders and other aspects of customer care.

16 Claims, 37 Drawing Sheets

U.S. PATENT DOCUMENTS

2002/0087341 A1* 7/2002 Kappel et al. .................. 705/1
2002/0156683 A1 10/2002 Stoutenburg et al.
2002/0199182 A1* 12/2002 Whitehead .................... 725/1
2003/0083944 A1 5/2003 Duvall et al.
2005/0114361 A1* 5/2005 Roberts et al. .............. 707/100

* cited by examiner

Account

Search Type: Account ▸    11016   ABC SALES

Account | 11016 Customer | 508 |

General | Defaults | Address | History | Invoice | Misc Credit

Period Summary

| Period | Total Invoices | Total Amount | COGS Amt | Margin Amt | Margin % |
|---|---|---|---|---|---|
| Mar 2003 | 2 | 19,112.76 | 249.25 | 18,863.51 | 98.70% |
| Feb 2003 | 2 | 19,616.18 | 0.00 | 19,616.18 | 100.00% |
| Jan 2003 | 2 | 20,022.27 | 198.75 | 19,823.52 | 99.01% |
| Dec 2002 | 2 | 23,062.43 | 1,572.76 | 21,489.67 | 93.18% |
| Nov 2002 | 2 | 19,203.49 | 181.50 | 19,021.99 | 99.05% |
| Oct 2002 | 2 | 22,683.11 | 136.50 | 22,546.61 | 99.40% |
| Sep 2002 | 4 | 60,187.82 | 19,450.72 | 40,737.10 | 67.68% |
| Aug 2002 | 3 | 31,917.19 | 1,792.65 | 30,124.54 | 94.38% |
| Jul 2002 | 2 | 21,715.58 | 1,611.04 | 20,104.54 | 92.58% |
| Jun 2002 | 2 | 19,127.25 | 178.00 | 18,949.25 | 99.07% |

Historic Bill Cycle

| System Date | Period ▼ | Cycle | Stmt # | Cur Due | 1-29 Past Due | 30-59 Past… | 60-89 P… | 90 > | Total Due |
|---|---|---|---|---|---|---|---|---|---|
| 04/10/2003 | Mar 2003 | 0 | 29399 | 1,426.14 | 17,686.62 | 0.00 | 0.00 | 0.00 | 19,112.76 |
| 03/12/2003 | Feb 2003 | 0 | 28831 | 0.00 | 19,616.18 | 0.00 | 0.00 | 0.00 | 19,616.18 |
| 02/10/2003 | Jan 2003 | 0 | 28255 | 1,957.16 | 18,077.61 | 0.00 | 0.00 | 0.00 | 20,034.77 |
| 01/10/2003 | Dec 2002 | 0 | 27686 | 5,548.27 | 0.00 | 0.00 | 0.00 | 0.00 | 5,548.27 |
| 12/10/2002 | Nov 2002 | 0 | 27121 | 1,419.33 | 0.00 | 0.00 | 0.00 | 0.00 | 1,419.33 |
| 11/11/2002 | Oct 2002 | 0 | 26553 | 0.00 | 4,898.95 | 0.00 | 0.00 | 0.00 | 4,898.95 |
| 10/11/2002 | Sep 2002 | 0 | 25979 | 0.00 | 7,296.47 | 0.00 | 0.00 | 0.00 | 7,296.47 |
| 09/10/2002 | Aug 2002 | 0 | 25405 | 14,133.03 | 0.00 | 0.00 | 0.00 | 0.00 | 14,133.03 |
| 08/09/2002 | Jul 2002 | 0 | 24837 | 3,931.42 | 0.00 | 0.00 | 0.00 | 0.00 | 3,931.42 |
| 07/11/2002 | Jun 2002 | 0 | 24263 | 0.00 | 1,343.09 | 0.00 | 0.00 | 0.00 | 1,343.09 |

- Date Based Pricing
- Multiple Price Groups
- Tiered Price Breaks
- Round to "Nearest" option

"With proper security, costing Info can be viewed at time of sale"

Fig. 16a

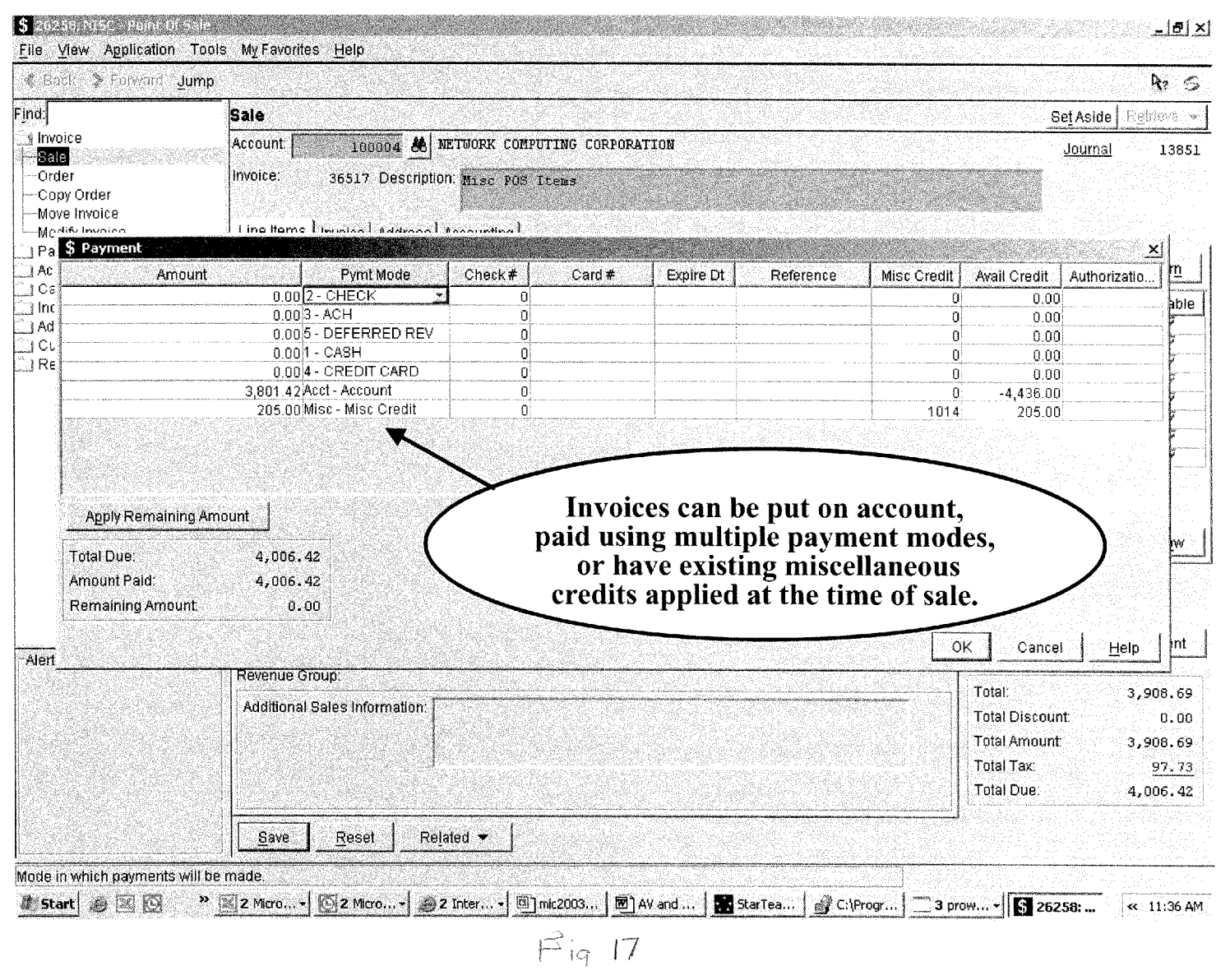

Invoices can be put on account, paid using multiple payment modes, or have existing miscellaneous credits applied at the time of sale.

Fig 17

Fig 18

METHOD AND APPARATUS FOR PROVIDING INTEGRATED MANAGEMENT OF POINT-OF-SALE AND ACCOUNTS RECEIVABLE

BACKGROUND OF INVENTION

1. Field of Invention

The present invention relates generally to computing environments. More particularly, the invention is directed to a system and method for providing integrated customer care, managing complex data relating to Point-Of-Sale (POS) activity.

2. Background Art

An integral part of any organization is the customer service. Managing the initial point-of-sale or quick counter sale is critical, therefore the customer service representative must have access to all information necessary to close the sale. In addition, long after the initial sale, an organization must be able to keep its customers satisfied otherwise someone else will successfully lure away the customer. Therefore, maintaining and managing data related to tracking and accounting of the sales is important. In addition to maintaining and managing the data must also be accessible. Generally, the nature of a business dictates the level of interaction with customers. Service industries must deal with their customers on a more regular basis than manufacturers or other industry sectors. The energy and telecommunications industries are examples of such service industries. Critical to today's competitive environment is information. Whether it is responding to a consumer's request, taking a customer's order, analyzing pricing changes, billing, tracking invoices or researching historical sales, a system is needed to provide detailed information that is needed for accurate and responsive decision making.

Energy and telecommunications industries are representative examples because every home or business utilizes one or more forms of energy or telecommunication services. As such, industries that provide these services tend to have a very large customer base, and have to handle a vast number of customer contacts in the form of telephone inquiries, point of sale contact and other electronic communiqué. As a result, a vast amount of data is guaranteed relating to orders, invoices, billings, and inventories. What this means is that in addition to the periodic desire of those customers to make alterations to their services, there are also the ongoing interactions with the customers that involve purchasing vertical product lines, customer orders, billing questions, payment arrangements, service interruptions, equipment malfunction and so on. Customer service representatives (CSRs) have to cope with all of the very diverse needs of the customers.

The energy and telecommunication industries are particularly plagued by varying aspects of customer service point-of-sale and billing maintenance including traditional customer service issues, customer orders, returns, miscellaneous credits, write-offs, billing related issues, service agreement issues, and government regulation issues. Traditionally, system and business paradigms for addressing these customer service maintenance issues have been focused at the individual account, or what is also termed the agreement level within this discussion. For example, a home with two telephone lines, electric service and gas service would be considered to have 4 separate agreements each of which pertain to the separate services. Traditional systems do not support multiple accounts receivable GL accounts per order and/or invoice, do not support divisionalized accounting, and do not support a point-of-sale interface.

As previously mentioned, customer service has traditionally been focused at the agreement or service level. By focusing customer service at the agreement level, it makes it extremely difficult if not impossible in some instances to pool or access consolidated information relating to a customer. For example, a telephone company records bills and accesses information by telephone number or location and not necessarily by customer. Similarly, an electric company accesses information by the physical location where the service is provided. In areas of the country where a single energy company, telecommunications company or cooperative provides multiple services, it is increasingly more difficult to get a handle on the entire position of a customer. It is very painstaking for a CSR to see the 'full picture' about a customer if the CSR must access agreements individually.

Accordingly, there exists a need for a collaborative and comprehensive solution that integrates all aspects of customer care, addresses consumer and subscriber billing, accounting, operations, product purchase, engineering and equipment, in order to enable a CSR to quickly and efficiently address customer needs. This is particularly more paramount because the success of any of these service-based businesses is heavily intertwined with its customer's perspective and the level of service that such customer receives.

Servicing a customer is another major challenge to a myriad of businesses. The objective is usually to provide quick, accessible and competent responses and solutions to the customer. To this end, in the utility or telecommunications industries, it is necessary to be able to quickly ascertain all of the facts and information pertaining to an individual customer or organization in order to fulfill work orders or service orders.

Prior art systems that have attempted to address these issues have primarily consisted of solitary solutions to specific areas of concern. In other words, these prior art solutions have typically created 'islands of automation'. For each island, certain functions are highly computerized and provide a solution, albeit a narrowly focused solution. However, this leads to problems of integration. The lack of interplay between the various systems requires that CSRs have to become conversant with multiple systems or rely on someone else to complete a task that relates to the customer with whom the CSR is communicating. From the organization's standpoint, there are usually a number of proprietary business tools from a multitude of manufacturers. Also many of the solutions historically have been character based, which provides a user interface that is not user friendly. Some graphical based systems have been implemented but are not customer centric and are not integrated and do not provide comprehensive support for multiple accounts receivable GL accounts per order and/or invoice or for divisional line of business accounting.

Business tools from different manufacturers are often not compatible with each other. This results in integration, redundancy and implementation problems. In addition, there are the licensing and/or development costs associated with obtaining the tools as well as the maintenance costs, which could be quite prohibitive to some companies. The above problems are particularly prevalent with information technology solutions relating to point-of-sale and accounts receivable customer care systems.

Accordingly, there exists a need for an improved customer care system that addresses the shortcomings described above. A fully integrated customer care system that provides a common interface to legacy system and facilitates access to customer information with a paradigm that is aptly suited and logical for traversing through the system is needed. A CSR should be able to access customer centric information, track customer contact, and manage point-of-sale relating to any jobs or service orders that arise from a customer contact.

SUMMARY OF INVENTION iVUE is an information technology solution that provides a customer-centric single point of entry through a graphical user interface for integrated access to and management of complex sets of data relating to Point-Of-Sale (POS), counter sales, customer orders, billings, and reports for the utility and telecommunications industry. The present invention is part of the Accounting and Business Solution (ABS) application of iVUE, which is the Accounts Receivable (AR) and Point-of-Sale (POS) technology solution. POS is a tool utilized by customer service representatives, customer service managers and information technology administrators to service both utility and telecommunication customers. However, the POS system could be utilized in other industries. The AR/POS application tool is implemented on a customer care computing system.

iVUE POS offers robust functionality for performing counter sales, customer orders and monthly billings. Whether a utility requires quick counter sale transactions or a detailed order tracking system, NISC's iVUE POS has the flexibility to handle both. The POS solution maintains up-to-date information on customers, orders and invoice[5] as well as provides subsidiary detail to support the accounts receivable balances in a legacy General Ledger (GL) application. Through the POS functional integration to iVUE's billing solution, a customer is able to receive a single bill for a plurality of services.

iVUE POS integrates the utility and telecommunications applications of iVUE with Accounts Payable, General Ledger, Material Inventory, Purchase Orders, Work Orders, Capital Credits, Installment Loans, Payroll, and Cash Register in order to access and manage customer account status, billings, sales and inventory.

The customer-centric design allows the user to utilize and navigate through the POS application tool to service customer inquiries and orders and to market and sell utility and telecommunication products while always keeping the customers account information in view as well as the up-to-date calculated inventory status, a system calculated tracking tool taking into account incoming purchases as well as outgoing sales and demands of items.

As opposed to having a customer care system architecture consisting of individual stand alone data processing silos of types of customer care information with no link between them (such as an order-centric system; or an account-centric system; or an invoice centric system; or a service order centric system) where only one data type for a given customer or account is in view at a given time; the present POS system is customer centric. The present customer centric invention always has the customer in view with direct access to all the customers information including all accounts, orders, statements and invoices. The customer centric architecture makes for a more robust customer care system.

This is made possible through the single point of entry graphical interface. The POS system is implemented utilizing object oriented code such as JAVA to provide a rich graphical user interface. The POS system can be hosted on a standard client-server local area network, but is flexible enough to be used on the internet where the graphical front-end is hosted on a local PC. The POS system is further implemented using frameworks or high level macro-functions, which consist of high level navigation macro-function, screen repository macro-functions, data-binding macro-functions, and data field repository macro functions. These frameworks can be executed by the objectoriented code for efficient and consistent data access and data entry. The frameworks also provide a consistent look and feel to the user interface.

The POS system is specifically designed for rural telecommunication and utility carriers and service providers, many of which sale vertical product lines in the telecommunication and utility industries such as mobile telephones and water heaters. Customer service representatives, managers and information technology administrators utilize the POS tool to set up new customer and existing customer orders, as well as market and sell telecommunication and utility industry products. The tool is also utilized to initiate and perform work-flows responsive to a customer contact. The work-flow templates will also assist the user to walk through step by step and perform the tasks for taking an order or providing a quote. The rich graphical user interface of POS and the application and data integration of POS is much more robust and powerful than existing character based systems of the industry where the application tools and data are segmented.

The core functions within the POS system supports counter sales, customer orders, and monthly billings with the flexibility to handle both quick counter sale (Point Of Sale) transactions and act as a detailed order tracking system. The AR function of POS maintains up to date information on customer, orders and invoices as well as support the general ledger. The integration of POS with the telecommunication and utility industry application billing solutions provides the capability for customers to receive a single consolidated bill. Furthermore, energy or telecommunication cooperatives using this product will be able to track the revenue associated with product sales, and provide allocations of margins back to them embers (Customers) through the Capital Credit module. The POS system maintains all aspects of sales orders including setup/generation, inquiry, returning sales order items, purging of sales orders, generation of sales order invoices, and tracking sales order activity. The POS system also maintains all aspects relating to counter sales including, refund credit and processing of pending return items.

The POS system supports multiple accounts receivable General Ledger accounts within a single order or invoice. This is required because within an order or invoice, each line item may represent an accounts receivable for a different line of business (Wireless, Landline, Cable TV, etc . . . ). The POS system is operable to interface with the utility customer care system and a telecommunication customer care system for providing an integrated customer care solution. The POS system is also operable to interface with legacy General Ledger, Accounts Payable, Payroll, Work Orders, Purchase Orders, and Material Inventory IT Solutions. The POS system through a single interface supports both stock and non-stock items as well as products and services.

The types of items for sale include such things as water heaters, electric ranges and refrigerators, cell phones, land line cordless phones and accessories. As part of the Point Of Sale (invoice) process allow the member to define different Accounts Receivable General Ledger account numbers at the line item level thus supporting the tracking of sale items within a particular line of business. As an example a telephone company may be providing land line as well as cellular service to the same end subscriber. When selling products, the telecomm company may want to track the sale of cordless phones and accessories separate from cell phones and accessories.

The POS product provides the automated due-to, due-from general ledger entries across all of the divisions in order to track the appropriate receivables/payables each line of business owes the other. The POS system can simplify the selection of stock vs. non-stock items when creating Orders and/or Invoices. In doing so, the sales person simply selects products from a catalog of items which tie to either an existing inventoried product or non-stock item. This can be accomplished in one of three ways; enter the item number if known, through a lookup process of all available items, or scan a barcode which contains the catalog number. Catalog Items can be optionally setup to relieve specific inventory items and update nonstock item history, working in conjunction with purchasing in order to get a more accurate cost-profit analysis or simply setup just as a item or service for sale. POS provides an intuitive, user-friendly, Graphical User Interface that will allow the operator to easily navigate throughout the system to check inventory and order products with minimal training required. POS provides the ability to establish default settings at the customer's account and/or catalog item level in order to reduce the required information during the entry of either Orders or Invoices.

The shortcomings of previous systems includes the fact that it was not intuitive to navigate through the systems because they were character based system. Other shortcomings were they did not support multiple accounts receivable GL accounts per order and/or invoice, did not support divisionalized accounting, and did not support a Point Of Sale (quick sale) interface. Previous systems also do not provide a solution that is integrated with utility and telecommunication solutions. This is greatly improved because the present POS graphical product takes advantage of the fact that many are already familiar with windows standards and already have that skill base, thereby improving the learning curve to adapt to the new iVUE solution. The rich graphical product is implemented by java and is web deployable. Also, the frameworks created to implement the user interface provides for quicker time to market, better adherence to standards, and a more consistent presentation leading to a more intuitive product. One key advantage within iVUE is the tight integration across the entire back-office ABS accounting suite of products as well as to the Utility and Telecomm billing engine for the purpose of creating a consolidated billing statement. The ability to enter, track and report on products and services that are specific to the different lines of business within each industry is now possible with this product.

BRIEF DESCRIPTION OF DRAWINGS

For a better understanding of the present invention, reference may be made to the accompanying drawings in which:

FIG. 5A is a screen shot of an exemplary user interface, which provides access to customer information in an embodiment of the present invention;

FIG. 5C is an illustrative table such as might be displayed within the summary area of the user interface screen of FIG. 3;

FIG. 5D is an illustrative display of a window in which an administrator can define a customizable field for display on the user interface screen of FIG. 3;

FIG. 6 is a screen shot of an exemplary user interface, which provides access to accounts information in an embodiment of the present invention;

FIG. 7 is a screen shot of an exemplary user interface, which provides access to Invoice-Sales in an embodiment of the present invention;

Figure 8:
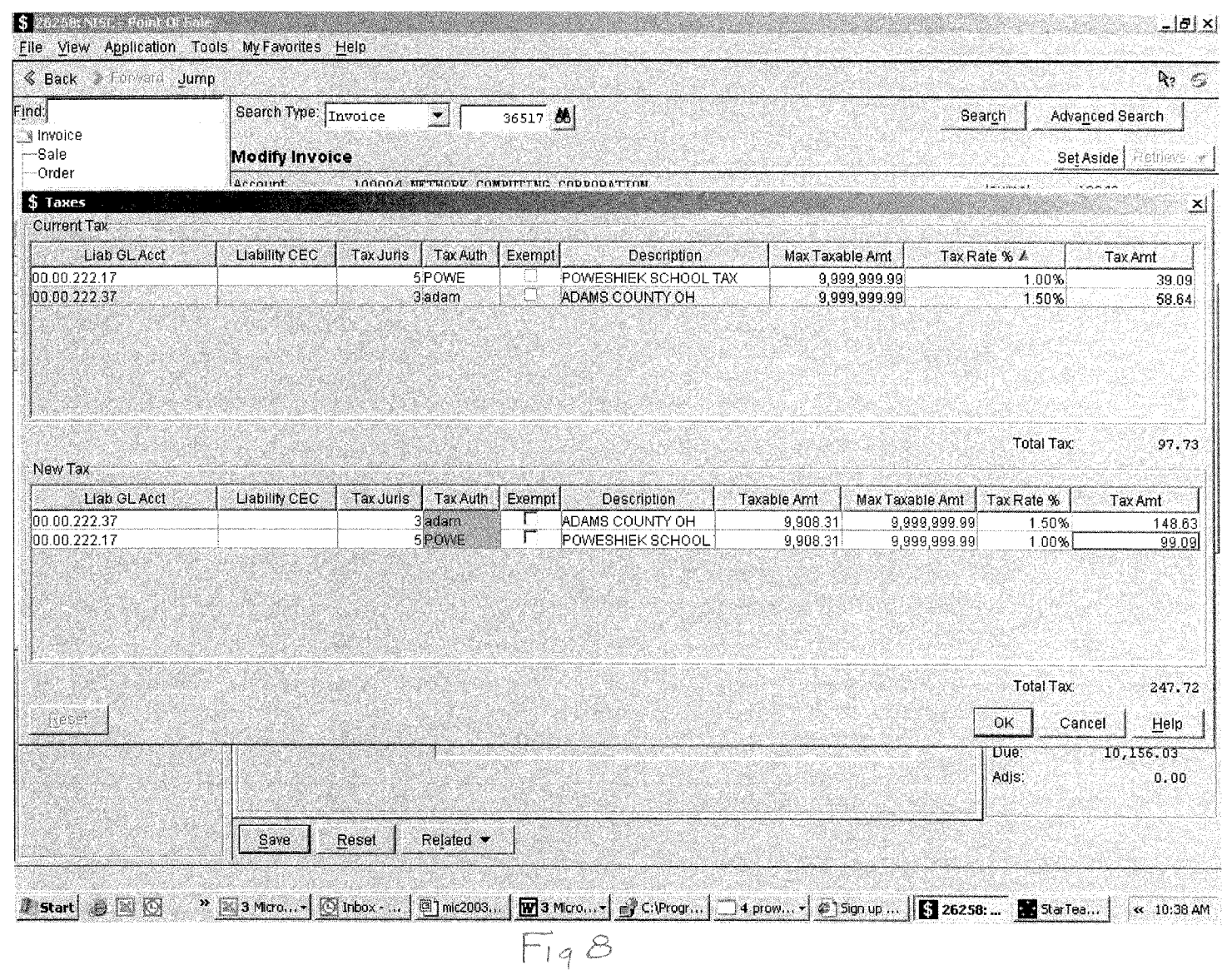

FIG. 8 is a screen shot of an exemplary user interface, which provides access to the Total Tax hyperlink screen;

Figure 9:
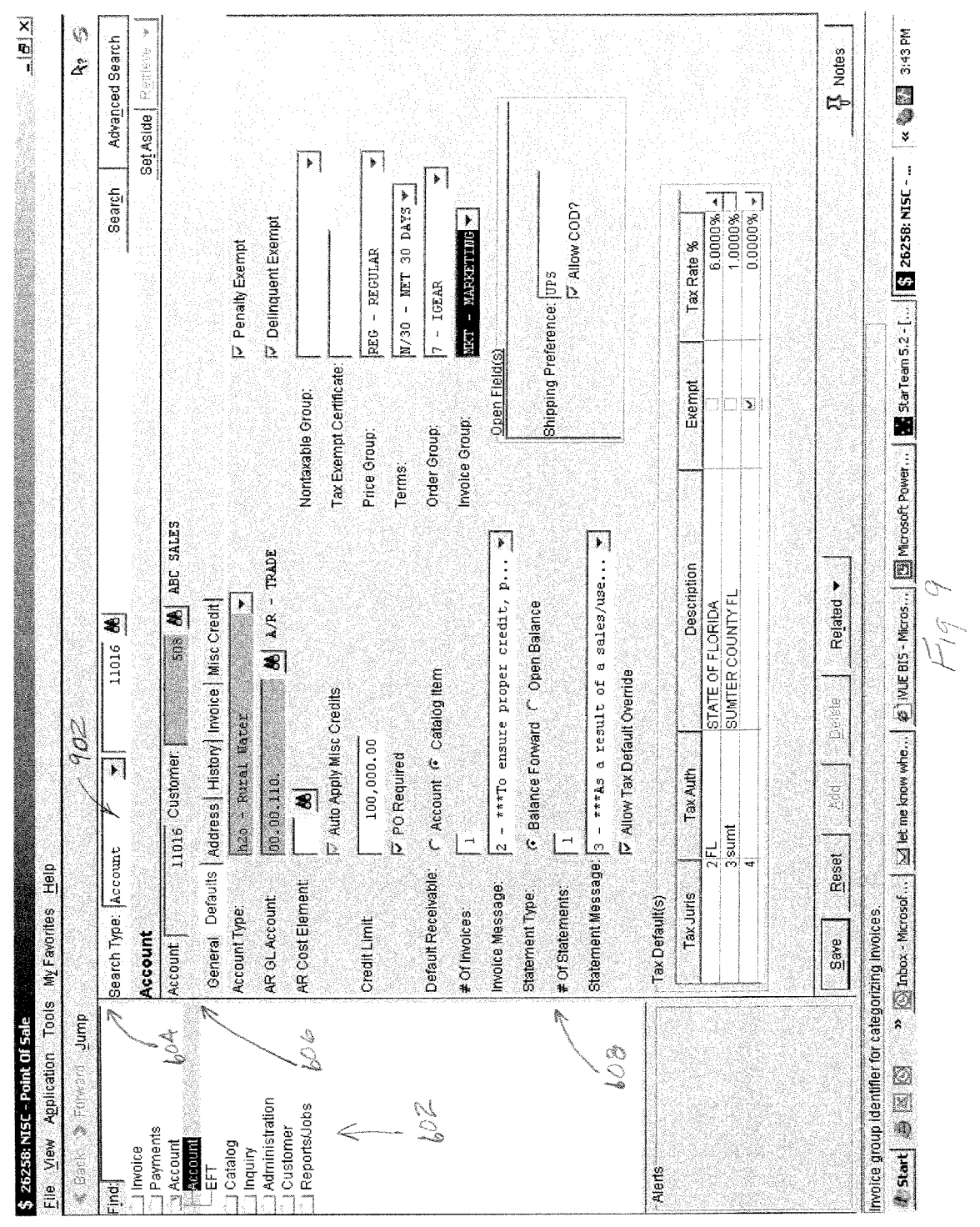

FIG. 9 is a screen shot of an exemplary user interface, which provides access to the default order/invoice information associated with a customer's account;

FIG. 10 is a screen shot of an exemplary user interface that provides access to an Account-Account History subnode screen in an embodiment of the present invention;

FIG. 11 is a screen shot of an exemplary user interface that provides access to the Catalog-Catalog subnode information in an embodiment of the present invention;

FIG. 12 is a screen shot of an exemplary user interface that provides access to a notes pop-up window in an embodiment of the present invention;

FIG. 13 is a screen shot of an exemplary user interface that provides access to Catalog-Catalog Pricing Table subnode reflecting all pricing currently established in an embodiment of the present invention;

FIG. 14 is a screen shot of an exemplary user interface that provides access to an edit pricing window in an embodiment of the present invention;

FIG. 15 is a screen shot of an exemplary user interface that provides access to Invoice-Sale subnode in an embodiment of the present invention;

FIG. 16 is a screen shot of an exemplary user interface that provides access to the Invoice-Sale Costing subnode in an embodiment of the present invention;

FIG. 16a is a screen shot of an exemplary user interface that provides warranty information;

FIG. 17 is a screen shot of an exemplary user interface that provides access to the Invoice-Sale Payment Window subnode in an embodiment of the present invention;

FIG. 18 is a screen shot of an exemplary user interface that provides access to Invoice-Modify Invoice subnode in an embodiment of the present invention;

Figure 19:
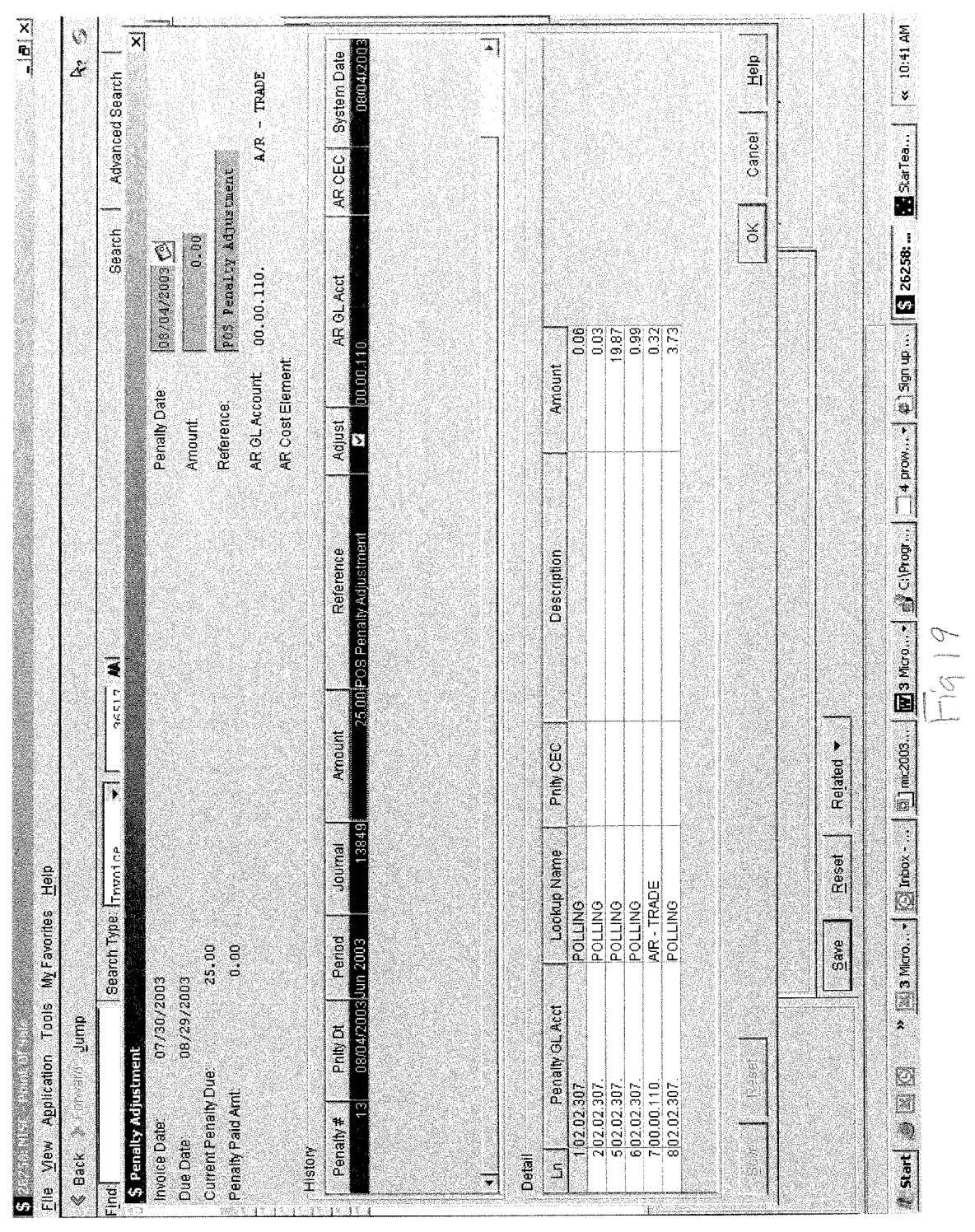

FIG. 19 is a screen shot of an exemplary user interface that provides access to the Penalty adjustment window;

FIG. 20 is a screen shot of an exemplary user interface for Invoice-Order subnode;

FIG. 20a is a screen shot of an exemplary user interface for a Partial-Invoice Order;

FIG. 21 is a screen shot of an exemplary user interface for the Invoice R turn window;

FIG. 22 is a screen shot of an exemplary user interface for the Payment-Payment Entry subnode;

FIG. 23 is a screen shot of an exemplary user interface for the Payment Distribution Detail pop-up;

FIG. 24 is a screen shot of an exemplary user interface for the Reverse Payment Confirmation pop-up window;

FIG. 25 is a screen shot of an exemplary user interface for the Payments-Distribution Credits subnodes;

FIG. 26 is a screen shot of an exemplary user interface for the Payments Refund;

FIG. 27 is a screen shot of an exemplary user interface for transaction inquiry;

FIG. 28 is a screen shot of an exemplary user interface for Inquiry-Statement Billing History;

FIG. 29 is a screen shot of an exemplary user interface for a jump-To function; and FIG. 30 is a screen shot of an exemplary user interface for a Find-Screen function.

DETAILED DESCRIPTION

Figure 1:
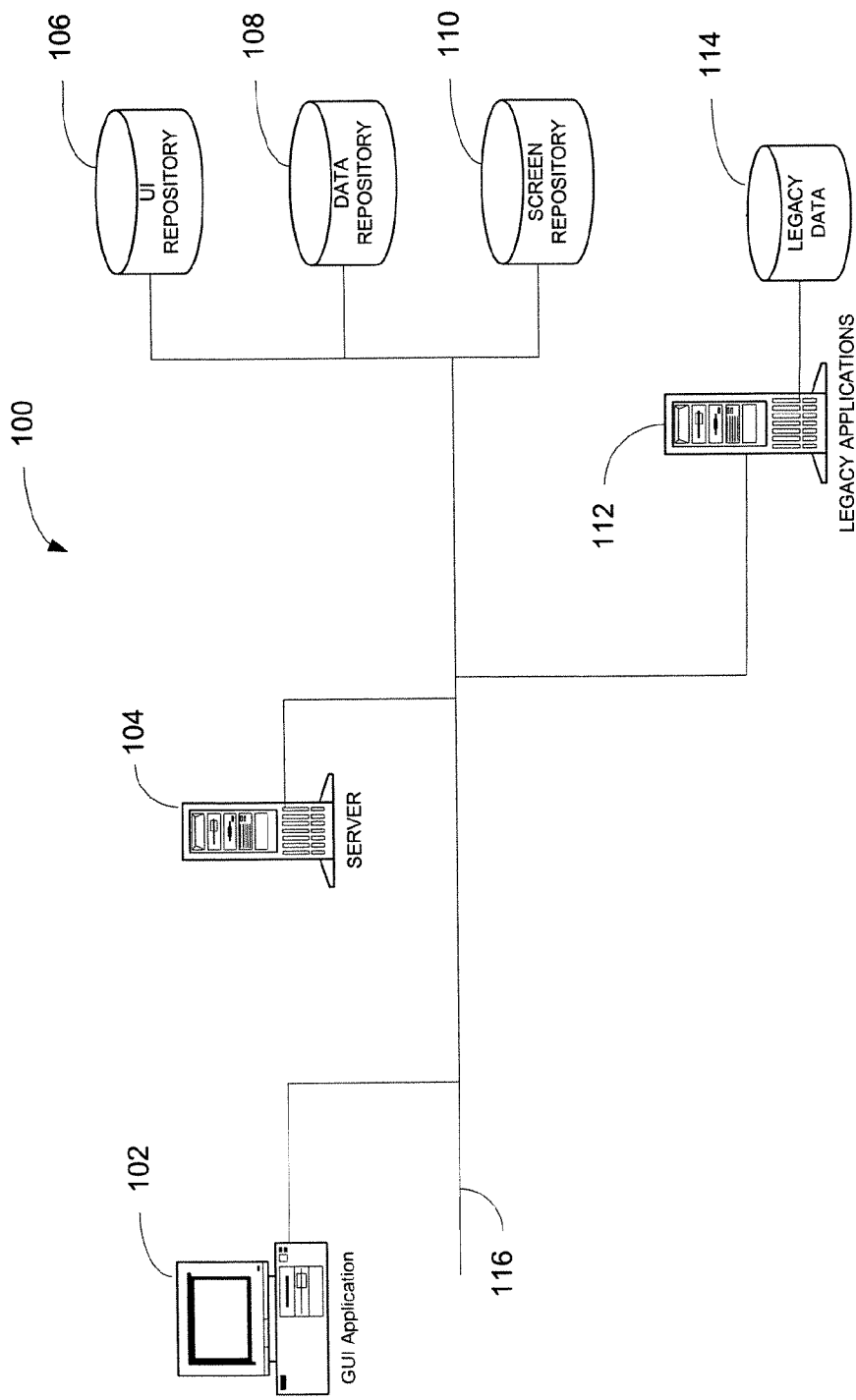
FIG. 1 is a network architecture diagram of a typical client server environment implementing a graphical user interface.

According to the embodiment(s) of the present invention, various views are illustrated in FIG. 1-30 like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

The present invention is directed to a system and method for providing customer care with an integrated customer centric tool. In the preferred embodiment of the present invention, the tool is provided in a client-server environment and utilizes an integrated development environment referred to as frameworks, which comprises repositories and XML based definitions. Frameworks, which is one tool for implementing the subject customer care system, is the subject of a separate United States application for letters patent Ser. No. 10/722,630, which is hereby incorporated by reference in its entirety. In brief, frameworks provides a set of macro-functions, data and user interface repositories that can be utilized in the development of various applications. The use of frameworks enables consistent presentation, operations and data handling across applications. Even further, frameworks provides an efficient and consistent means for navigation within applications. The present invention incorporates many features and tools that are based upon frameworks however, a detailed discussion on frameworks is beyond the scope of the present discussion. Frameworks as defined herein is not provided with the intent to suggest in any way that frameworks is the only means of implementing the POS system. Frameworks in no way limits the present invention. iVUE is a single-point of entry, GUI providing integrated access to various information technology solutions for the integrated processing of data, reports, billing and work flows, in a customer centric format. iVUE comprises many features and tools that allow an organization's CSR to efficiently handle all aspects of a customer's needs as they relate to the services provided by the organization. For the purpose of illustration and in order to demonstrate the flexibility and possibilities of iVUE POS, two functional applications are described below (CIS & SIS) but are not the primary focus of this application and are only described as a segue to facilitate the discussion of the focus of this application (POS). The CIS and SIS applications are the subject matter of a separate application Ser. No. 10,735,470 and is hereby incorporated by reference for completeness. However, the CIS and SIS applications are described for illustration only and in no way limit the present POS invention as claimed.

In the preferred embodiment of the present invention, a customer care system is implemented. This embodiment of the customer care system is referenced herein as iVUE POS. It should be understood that the term iVUE is utilized to facilitate the discussion and is in no way intended to limit the present invention to any particular version or feature of the named product.

To illustrate one environment of iVUE, the first functional application described as a segue to the POS discussion involves a Customer Information System (CIS), an information technology solution directed to utility provider organizations. The second functional application involves a Subscriber Information System (SIS) for use by telecommunication service providers. The embodiments can be utilized separately or combined into one integrated application. The two embodiments while having unique features can have a consistent look and feel as made possible through the use of the frameworks.

The CIS product includes among other things, location management, administration, reports and job management. CIS also supports diversification, deregulation and other billing options that pertain to the utility industry.

The SIS product integrates billing, accounting, service, agreement and other information. It provides access to, and management of, customer account status, history, service order as it relates to LEC's, CLEC's, Wireless, CATV, Internet, and Pager agreements and equipment purchase, in order to efficiently service the needs of customers.

The Point of Sale System (POS), which is the subject of the present application is adapted to integrate with utility and telecommunication applications such as CIS and SIS, but POS is in no way limited by the CIS and SIS applications. The details of the invention and various embodiments can be better understood by referring to the figures of the drawing. Having briefly provided an overview of the present invention, one embodiment of the invention will be discussed with reference to FIGS. 1-30. An exemplary operating environment for the present invention is first described below.

Referring to FIG. 1, a functional diagram of a typical client server environment 100 implementing a graphical user interface is shown. A typical client 102 is shown interfacing with a typical server function 104. The server 104 interfaces with a bank of repositories 106. The bank of repositories includes a user interface (UI) repository 106, a Data Binding Repository 108 and a Screen Repository 110. The server and repository functions interface with legacy application 112 and a legacy database 114. The graphical user interface applications 102 are shown resident at the client site on a customer care computing system. The graphical user interface application provides graphical user interface screens as well as a data entry capability. The integrated repositories 106 allow the graphical user interface application 102 to run more efficiently and provide a rich graphical presentation having a consistent look and feel. The graphical user interface application is also able to interface to various legacy applications and legacy databases by utilizing the integrated repositories to provide much of the data handling functionality. The various repositories are linked to various object oriented applications that execute at run time to perform much of the data binding and field definition functions as well as screen arrangement. The graphical user interface application triggers execution of the repository functionality as well as imports data and graphical information in order to generate the graphical user interface. There are other client-server environments in which the POS application can operate that are known to those skilled in the art, thus the functional diagram is in no way limiting on the present POS invention.

Figure 2:
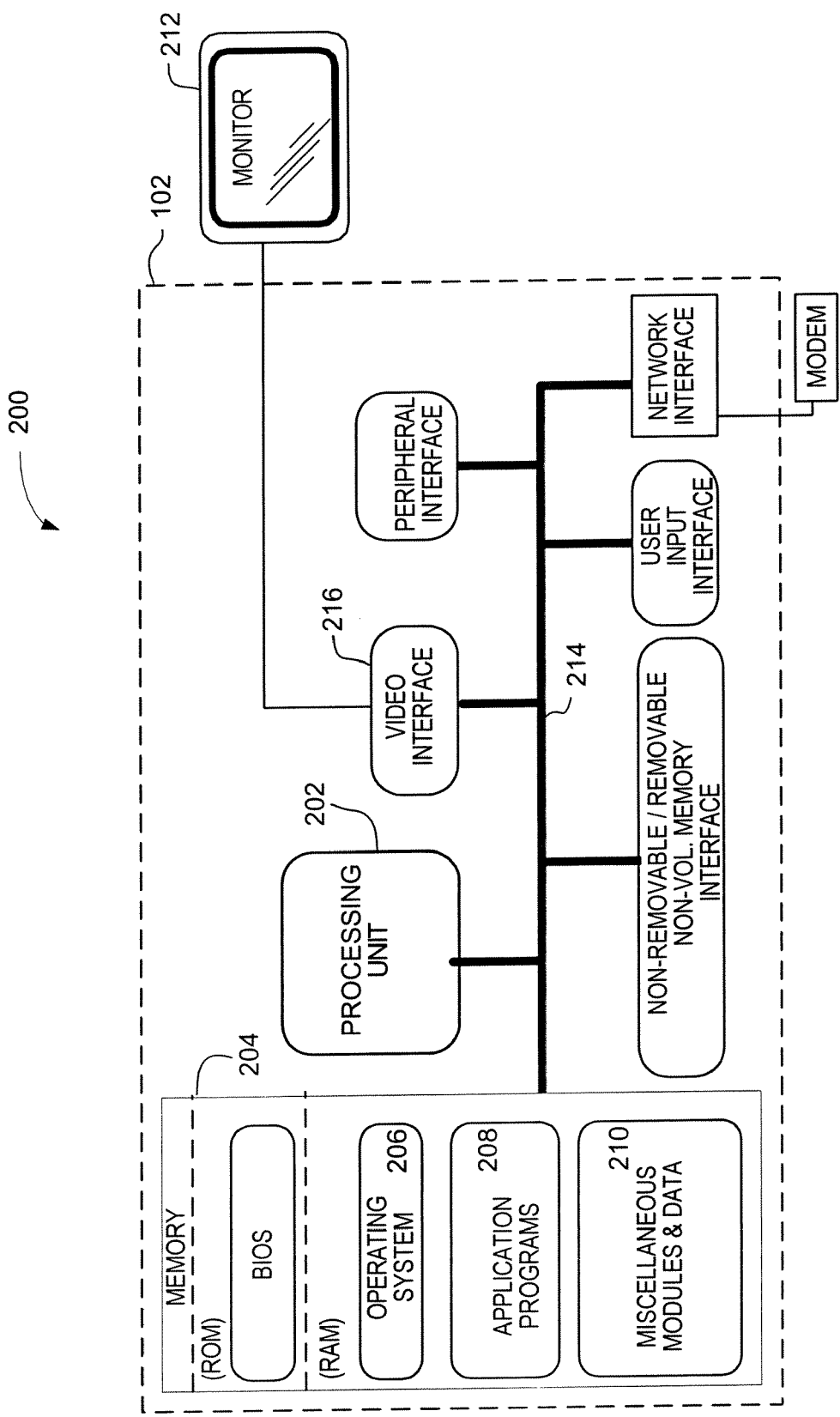
FIG. 2 is an illustrative diagram of a client environment for practicing the present invention.

Referring to FIG. 2, an example of a suitable computing system environment 200 in which the invention may be implemented is illustrated. The computing system environment 200 is only one example of a suitable computing environment and is not intended to suggest any limitation as to the scope of use or functionality of the invention.

In that regard, the present invention may be described in the general context of computer-executable instructions, such as program modules, being executed by a computer. Generally, program modules include routines, programs, objects, components, data structures, etc. that perform particular tasks or implement particular abstract data types. Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. When operating in a distributed computing environment, program modules may be located in both local and remote computer storage media including memory storage devices. Additionally, various functions that will be described herein may be implemented by modules that exist wholly or partially on a client system or a server.

The computing environment 200 should not be interpreted as having any dependency or requirement relating to any one or combination of components illustrated in the exemplary operating environment 200.

With reference to FIG. 2, an exemplary system 200 for implementing the invention includes a general purpose computing device in the form of a computer 102 including a processing unit 202, a system memory 204, and a system bus 216 that couples various system components including the system memory to the processing unit. Importantly, the variant of the computer 102 utilized as the client PC must support a playback mechanism and data rates suitable for high end image rendering.

Computer 102 typically includes a variety of computer readable media, which may comprise computer storage media and communication media. The system memory includes computer storage media in the form of volatile and/or nonvolatile memory such as read only memory (ROM) and random access memory (RAM). A basic input/output system (BIOS), containing the basic routines that help to transfer information between elements within computer 102, such as during start-up, is typically stored in ROM. RAM typically contains data and/or program modules that are immediately accessible to and/or presently being operated on by processing unit 202. For illustrative purposes, FIG. 2 depicts operating system 206, application programs 208, and other miscellaneous program modules and data 210.

The computer 102 may also include other removable/non-removable, volatile/nonvolatile computer storage media. Such removable/non-removable, volatile/nonvolatile media may include a hard disk drive, a magnetic disk drive, an optical disk drive, a CD ROM or other optical media. Other removable/non-removable, volatile/nonvolatile computer storage media that can be utilized include, but are not limited to, magnetic tape cassettes, flash memory cards, digital versatile disks, digital video tape, solid state RAM, solid state ROM, and the like.

The drives and their associated computer storage media discussed above and illustrated in FIG. 2, provide storage of computer readable instructions, data structures, program modules and other data for the computer 102. A user may enter commands and information into the computer 102 through a variety of input devices including but not limited to a keyboard, pointing device, scripting interface, a microphone, joystick, game pad, satellite dish, scanner, or the like. These and other input devices may be connected by other interface and bus structures, such as a parallel port, game port, fire-wire, or a universal serial bus (USB). A monitor 212 or other type of display device is also connected to the system bus 214 via an interface, such as a video interface 216. The computer 102 may also include output devices such as speakers, printers, and the monitor 212, which may be connected through a peripheral interface.

The computer 102 in the present invention operates in a networked environment using logical connections to one or more remote computers. The remote computer(s) may be a personal computer, and typically includes many or all of the elements described above representing the computer 102. The computer 102 illustrated in FIG. 2 may include connections to a local area network (LAN), a wide area network (WAN) or other networks including the Internet.

When used in a LAN networking environment, the computer 102 is connected via a network interface card (NIC) or adapter. When used in a WAN networking environment, the computer 102 may include a modem or other means for establishing communications over the WAN. In a networked environment, program modules discussed or depicted relative to the computer 102 or portions thereof, may reside in remote memory storage or across multiple devices. It will be appreciated that the network connections shown are exemplary and other means of establishing a communications link between the computers may be used.

Those of ordinary skill in the art will appreciate that there are several other components and interconnections present within a computing environment such as computer 102 and these are well known. Accordingly, additional details concerning the internal construction of the computer 102 will not be discussed in connection with the present invention.

Having provided a broad overview and introduced the environment, devices and nomenclature, the process of the present invention can better be understood and will be discussed with reference to flow diagrams and screen illustrations in FIGS. 3-30.

Figure 3A:
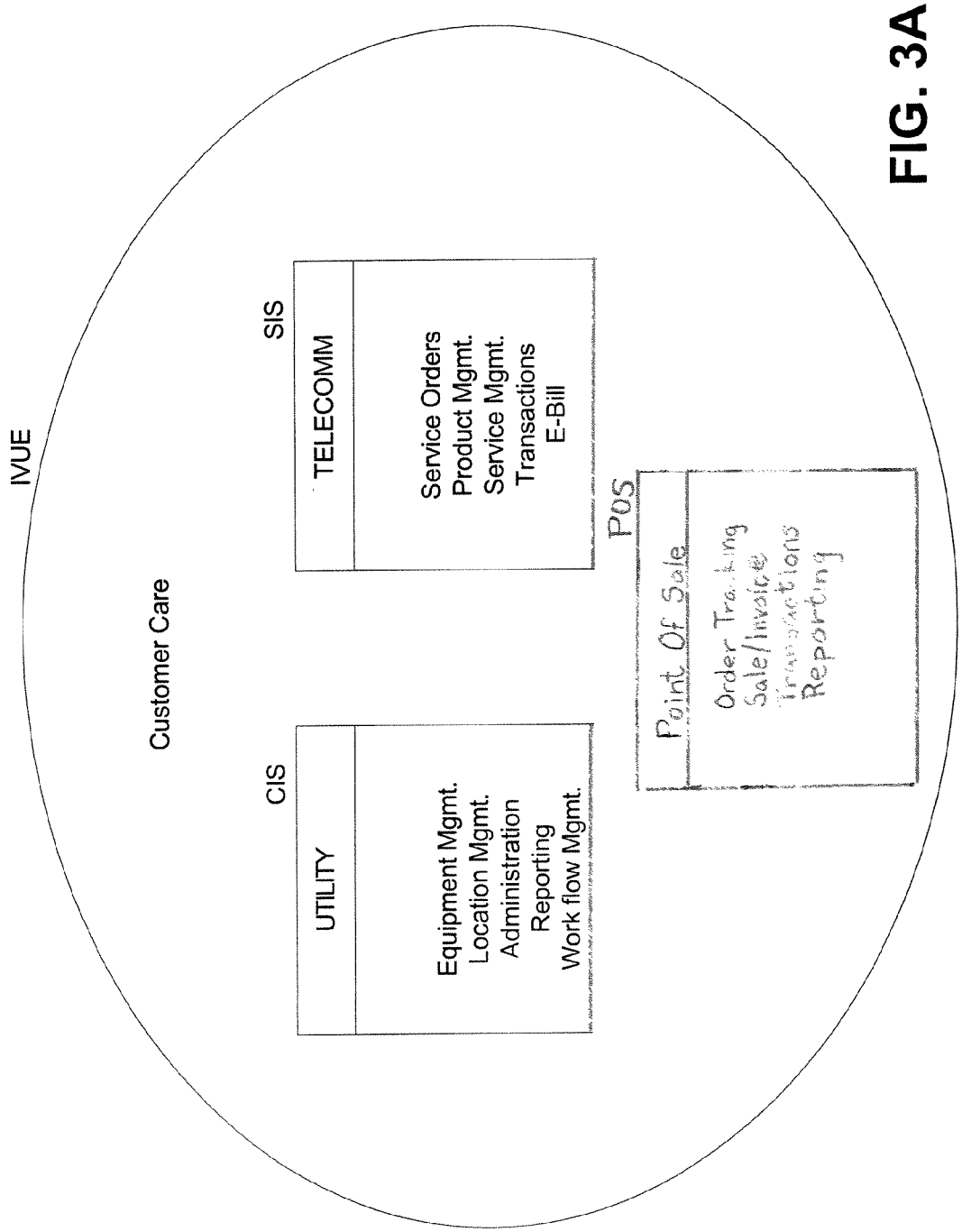
FIG. 3A is a diagram of the iVUE application architecture, illustrating its relationship to the Customer Information System and Subscriber Information System applications and Point of Sale System (POS)

FIG. 3A illustrates the relationship of POS, CIS, SIS and iVUE. Both CIS and SIS are applications that implement various features of iVUE in addition to providing some unique options which are particularly suited for their respective industries. However, as indicated above CIS and SIS are only described for illustration of a typical environment where POS may be utilized.

iVUE provides through the implementation of frameworks, a customer centric care system that integrates customer tracking accounting and billing functions, simplified navigation and end user customization. iVUE further provides consistency of integration to legacy systems.

As illustrated, CIS couples the functions of iVUE with work flow management and other features to provide a technology solution for the utility industry. SIS on the other hand couples iVUE with customer service solutions including accounting functions and service implementation management. POS is adapted to integrate with both functional applications.

Certain aspects of the CIS and SIS applications share a common theme. In particular, CIS and SIS share the highly intuitive customer centric view featured by IVUE, through its graphical user interface and integrated customer care solution.

Figure 3B:
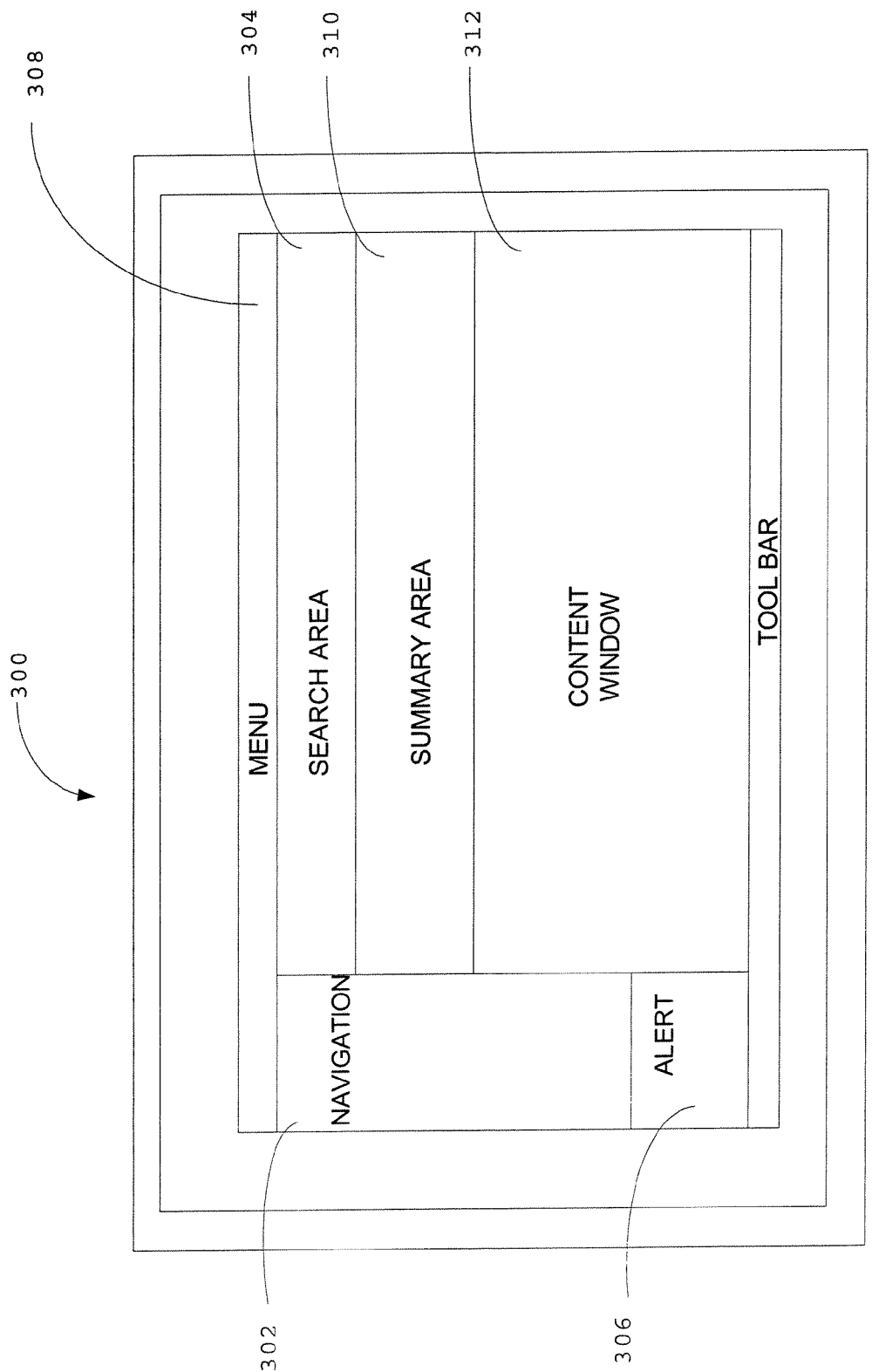
FIG. 3B is an illustration of a user interface in iVUE, depicting the component windows implemented in the present invention.

Referring to FIG. 3B, a graphical user interface (GUI) generally utilized in the present invention is illustrated and referenced as display 300. The present invention is described with reference to a single point of entry and GUI that provides access to a variety of solutions for an integrated customer centric environment. It would be understood by one skilled in the art that the illustrative windows and arrangement of the GUI can vary in content, without departing from the scope of the present invention.

As previously discussed, a predominant aspect and feature of the present invention is the customer-centered paradigm. To this end, the GUI windows for content display, navigation and general information presented to the CSR are designed and provided to further, quick, detailed access and display of relevant customer information. It should be understood that while the present invention is described with reference to a CSR, such reference would equally be applicable to any other operators or interface programs that interact with iVUE. The term operators can include a customer who is utilizing an interface device or system to access the customer care system of the present invention. One example of such interaction may be through a web browser over the internet.

The GUI interface of iVUE includes screens that generally conform to the illustrated application screen of display 300.

As shown, display 300 provides a dynamic user interface having some very specific window areas. The window areas include a navigation window 302, a search window 304, an alert window 306, a menu window 308, a summary area 310 and a content window 312. Each of these window areas provides a CSR with data or options that facilitate the task of customer care. The details of the content of these windows are best understood by reference to specific screens in the exemplary iVUE application and a discussion on the customer centered paradigm.

As discussed earlier, iVUE is a customer centric program which include features that facilitate ease of navigation, delivery of solutions to customer needs and interaction with legacy systems while also enable contact tracking and reporting. The CSR can access all information in a customer centric format through the single point of entry customer care environment without exiting the environment to access other applications for example, POS which is the subject of the present invention can access data from applications like CIS and SIS without exiting the POS application and while always maintaining the customer in view. With this customer centric single point of entry environment there is no need to segment your CSRs, for example CSRs who address billing questions segmented from CSRs who add, cancel, or modify customer orders or point-of-sale transactions. All CSRs will have single point of entry access and the right graphical user interface makes the application more intuitive to use thereby reducing the learning curve of the CSR and allowing a given CSR to service all needs. An individual or organizational customer is the focus and hub for reference and access to the operations provided by the system. The definition of a customer may vary across environments. Within the consumer environment a customer may be an individual. However, within the business environment a customer may be a business unit, a subsidiary or other business entity. Data retrieval, display or collection is centered around the customer. As such, all interaction begins with the customer.

Figure 4A:
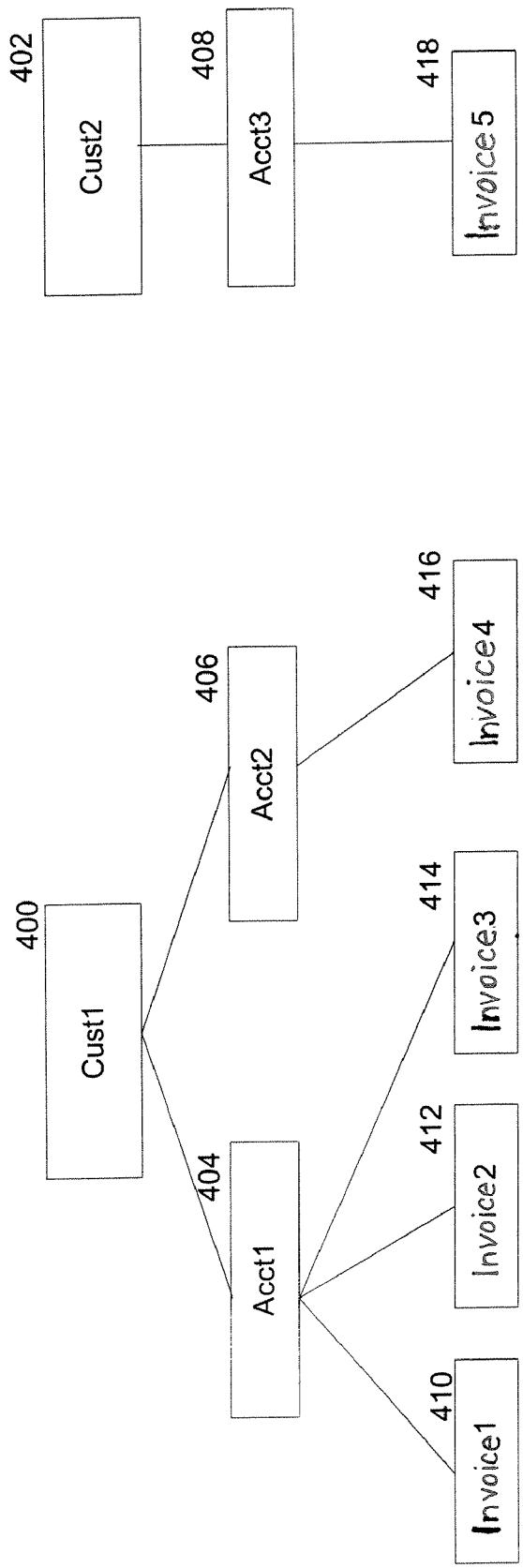
FIG. 4A is a diagram representative of the hierarchy and relationship of customer accounts and services in the present invention.

The customer centric paradigm of the present invention defines a certain relationship between a customer and the other system identifiers that relate to the customer's service. Referring to FIG. 4, a diagram representative of the hierarchy and relationship of the various identifiers of the present invention is illustrated. As discussed earlier, iVUE is customer centric. This means that the iVUE customer care application implements a hierarchy that is focused on the customer. As shown, a customer 400, 402 is the top level of the hierarchy. A customer is identified within the invention by a unique qualifier such as a customer number. The customer number may be randomly generated or assigned. The customer record also identifies some personal information about the customer. A customer can have one or more accounts 404, 406, or 408.

Figure 5A:
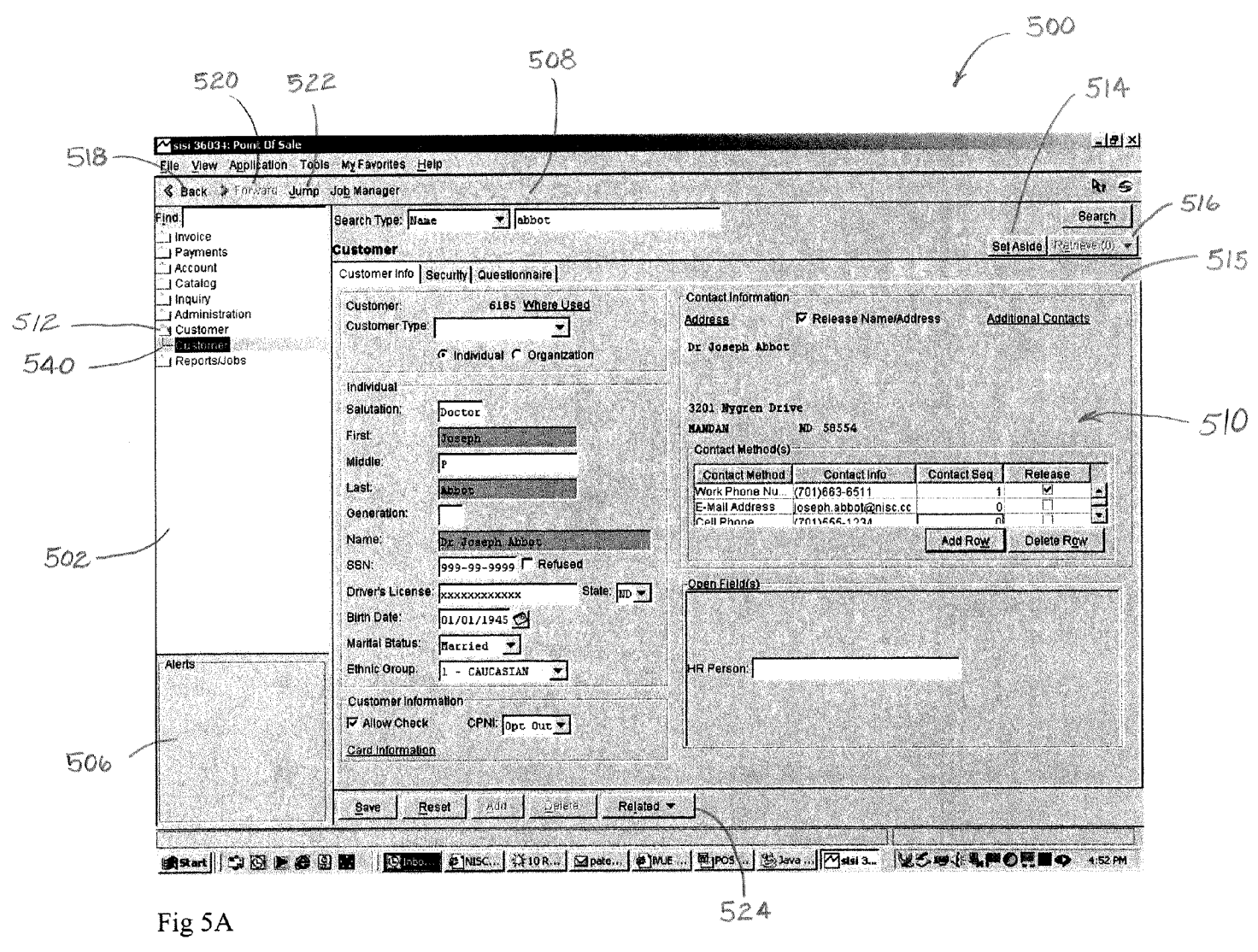

The account level 404, 406, and 408 establishes the billing level for a particular customer. For example, a first customer cust1 400 has a first account acct1 404 and a second account acct2 406. This means that two separate bills/statements will be generated for cust1 400. On the other hand cust2 402, which has only one account acct3 408, will receive only one bill/statement, which is associated with acct3 408. For each account there can be one or more invoices. In the context of a telecommunications application, an agreement represents a service such as telephone (LEC & CLEC), wireless, cable television (CATV) or internet. In the context of a utility application an agreement or represents gas, electric, Propane, Security Lights, and so on. As shown, Acct1 404 has three separate invoices Invoice1 410, invoice2, 412 and invoice3 414. All three invoices will be billed to acct1 404. The bill for Acct2 406 will reflect the charges associated with invoice4 416. In a similar manner, acct3 408 will reflect the charges of invoice5 418 for cust2 402. The bill/statement for acct1 404 will reflect the total charges associated with invoice1 410, invoice 2 412, and invoice3 414. If invoice4 416 for Acct2 406 is marked to be transferred to the wireless agreement in IVUE, SIS, then invoice4 416 will be reflected as being paid with the Accounts Receivable balance transferred to IVUE SIS to be satisfied as part of the consolidated bill print process. The same would be true if invoice5 418 for acct3 408 was marked to be transferred to the electric agreement in IVUE, CIS, invoice5 418 would be reflected as being paid with the Accounts Receivable General Ledger balance transferred to IVUE CIS to be satisfied as part of the consolidated bill print process. A customer care screen provides some of the relevant demographic data and means to navigate and search the system. An exemplary screen display 500 of the GUI that is presented to a CSR regarding a customer is shown in FIG. 5A. By providing a particular piece of customer identification information as a search criterion or through other such means, a CSR is able to obtain detailed information about a particular customer—a focus customer. For the purpose of clarity and to aid the understanding of the present discussion, a current customer being handled by the CSR or other operator of the customer care system is referred to as a focus customer. The present POS invention is adapted to provide flexible billing schemes such as consolidated billing including billing for vertical product lines.

Figure 4B:
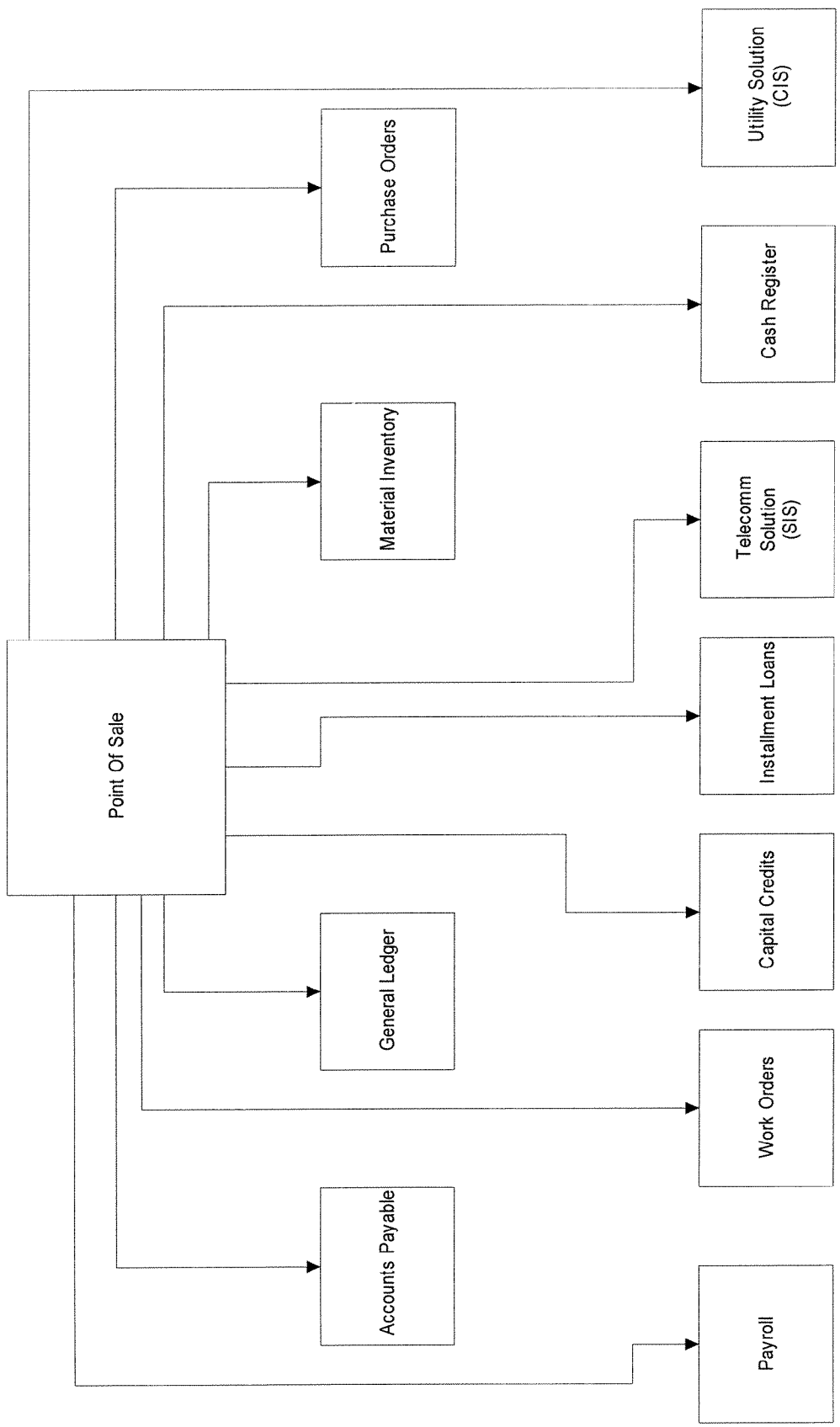
FIG. 4B is a diagram representative of the POS Application Interface with the legacy applications and the utility/telecomm solution.

Referring to FIG. 4B, a functional diagram is shown depicting the interface between ABS (POS) and the legacy systems and the utility and telecommunication solutions.

Figure 4C:
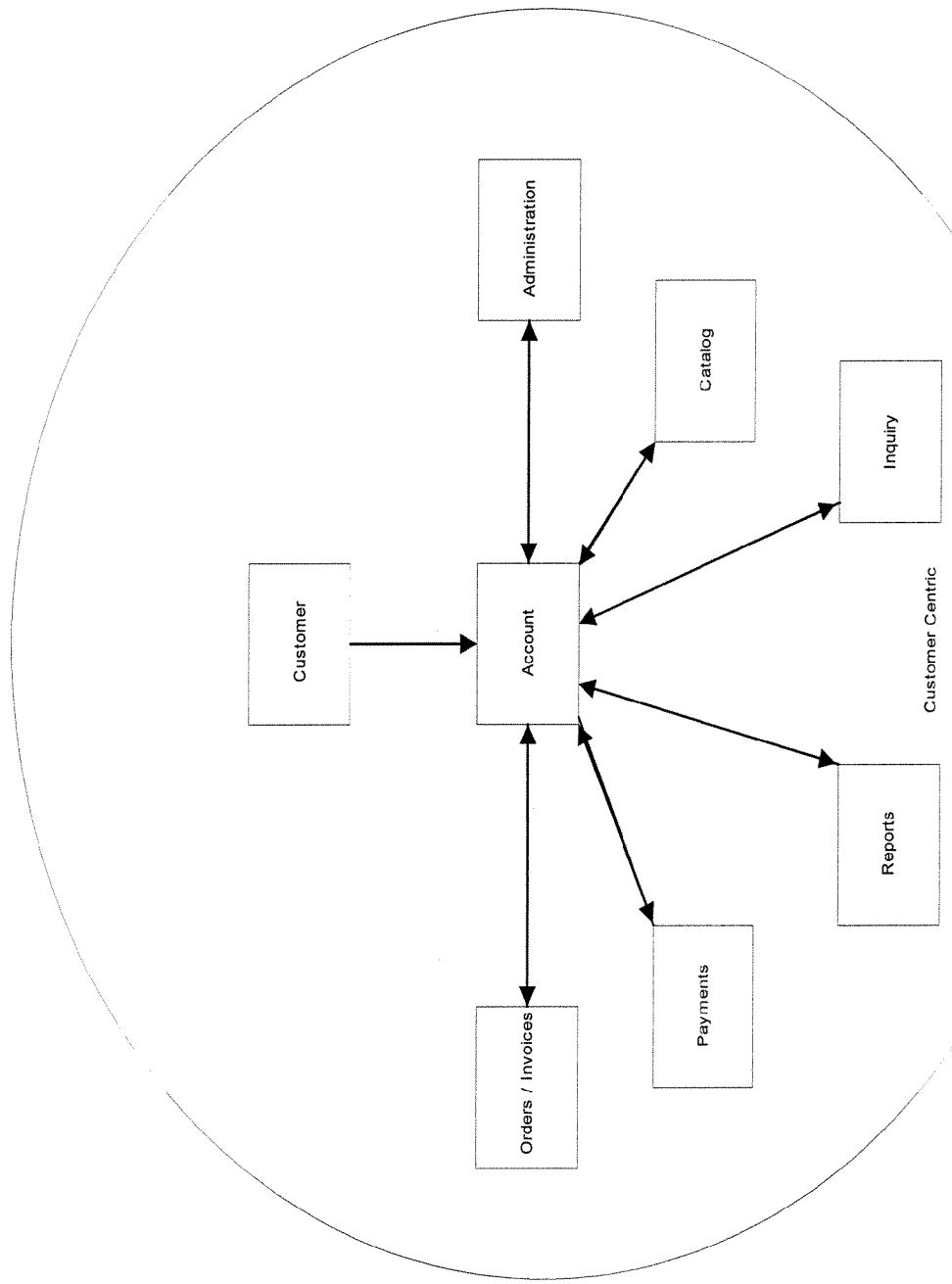
FIG. 4C is a diagram representative of the customer centric nature of the application.

Referring to FIG. 4C, a functional diagram reflecting the customer centric nature of the POS application where all POS functions can be accessed while keeping the customers account in view. The customer-centric design allows the user to utilize and navigate through the POS application to service customer inquiries and purchase orders and to market and sell utility and telecommunication products while always keeping the customer information in view, along with an up-to-date inventory status, and purchase order status. As opposed to having a customer care system architecture consisting of individual stand alone data processing silos of types of customer care information with no link between them (such as an order-centric system; or an account-centric system; or an invoice centric system; or a service order centric system) where only one data type for a given customer or account is in view at a given time; the present POS system is customer centric. The present customer centric invention always has the customer in view with direct access to all the customers information including all accounts, orders, statements, customer inquiries, payments, customer information and invoices. The customer centric architecture makes for a more robust customer care system. The present customer centric ABS invention provides customer care information retrieval schemes, customer care information displaying screens and customer care information grouping schemes that are related to the present customer in view. Customer Care information items related to servicing the customer in view can be quickly accessed.

Figure 7:
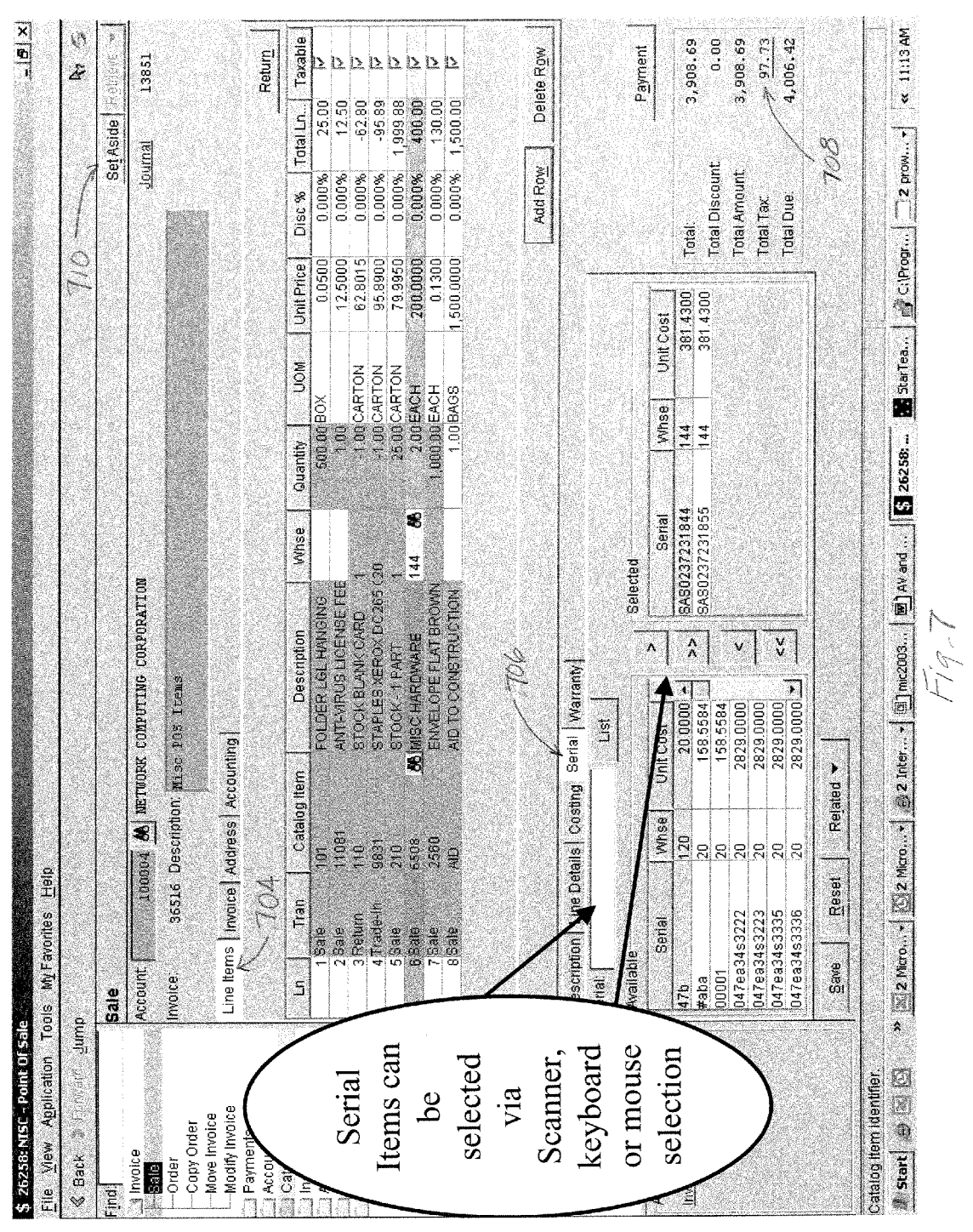

The present POS invention also provides a 'set aside' button as shown in FIG. 7 and a 'retrieve' button to allow a user to set work aside without having to save the current operation. In other words, the application of the present invention allows a Customer Service Representative (CSR) to multi-task by temporarily placing a current operation aside to work on another operation. The CSR can then return to the previously set aside operations and continue where they left off. There is no limit to the number of screens that can be set aside and the screens that are set aside can be recalled in any order.

In connection with access to customer information, display 500 includes several of the window areas described earlier and illustrated in FIG. 3B. Returning to FIG. 5A, a navigation window 502, provides a tree display of options and screens that are available to the CSR. The tree display comprises nodes and related sub nodes. The nodes or sub nodes are available to a CSR for selection and navigation. The nodes refer to functional graphical user interfaces which are represented as functional blocks in FIG. 4C. A CSR is able to move through the system, display screens and access the information identified by the displayed node or sub-node labels. A more detailed view of the navigation window 502 is illustrated in FIG. 5B.

Figure 5B:
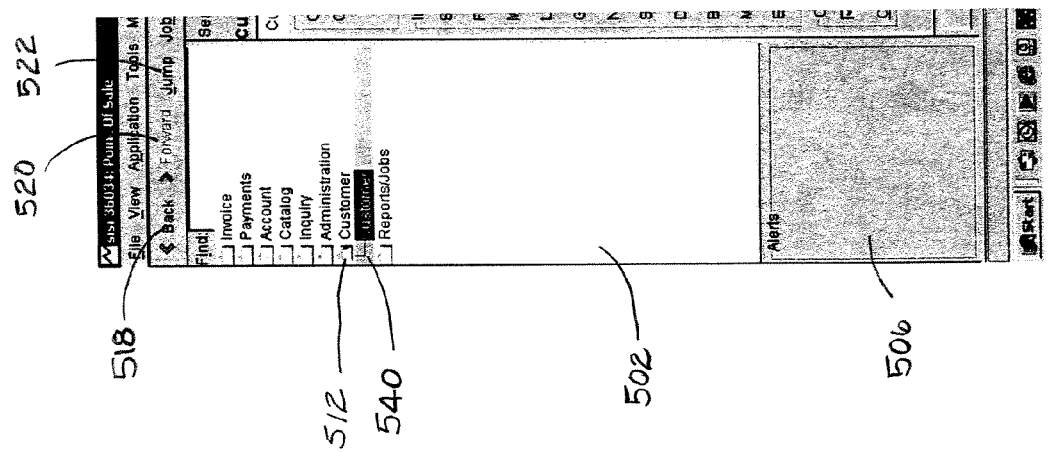
FIG. 5B is an illustration of the left navigation and alert windows of the user interface of the present invention.

As illustrated in FIG. 5B, certain categories of information have been defined and identified as nodes 512 within the tree display of the left navigation window 502. As shown, there can be sub nodes 540 associated with the nodes 512. Access to various actions and information can be accomplished by navigating the system using the nodes 512 or sub nodes 540. The selection of a node 512 will result in the presentation of an associated window or the display of one or more related sub-nodes 540. In the case were sub-nodes 540 are displayed, the sub-nodes 540 can then be selected by the CSR to access an associated window of information.

Returning to FIG. 5A, the selection of a node 512 or sub-node 540 results in a change within the content window 510. Importantly, any selection of a task, view or action from within the navigation window 502 or content window 512, results in a display of associated information that pertains to the focus customer. The menu window 508 presents a user with means to quickly navigate between screens. For example, the 'back link' 518 and 'forward link' 520 allow a user to navigate to a previous screen or screens in much the same way as similarly identified buttons on internet browsers. A 'jump link' 522 enables quick navigation to screens, which the user can specify by name.

During the setup of an iVUE system, by someone with appropriate security access, display screens can be assigned short identifications or nicknames. The nicknames or identification may then be used to invoke those screens from the 'jump link' 522.

A 'set aside' button 514 and a 'retrieve' button 516 allow a user to set work aside without having to save the current operation. In other words, the application of the present invention allows a CSR to multi-task by temporarily placing a current operation aside to work on another operation. The CSR can then return to the previously set aside operations and continue where they left off. There is no limit to the number of screens that can be set aside and the screens that are set aside can be recalled in any order.

Also available on the screen 500 is a related button 524. Selection of the related button 524 provides quick navigation to a screen that a CSR would most likely be interested in viewing. In other words, certain displays may be preconfigured as being related to one another, thus allowing quick access. For example, a payment history display may be configured as the related screen to the customer account display screen.

Also available are various hyperlinks. The hyperlinks cause the screen 500 (document viewer) to display a different view of either the same set of information or a different set of information. The hyperlinks further enable a high level of interaction, thus allowing a much more complex structure of screens and information to be traversed quickly and efficiently by a CSR.

Figures 5C, 5D:
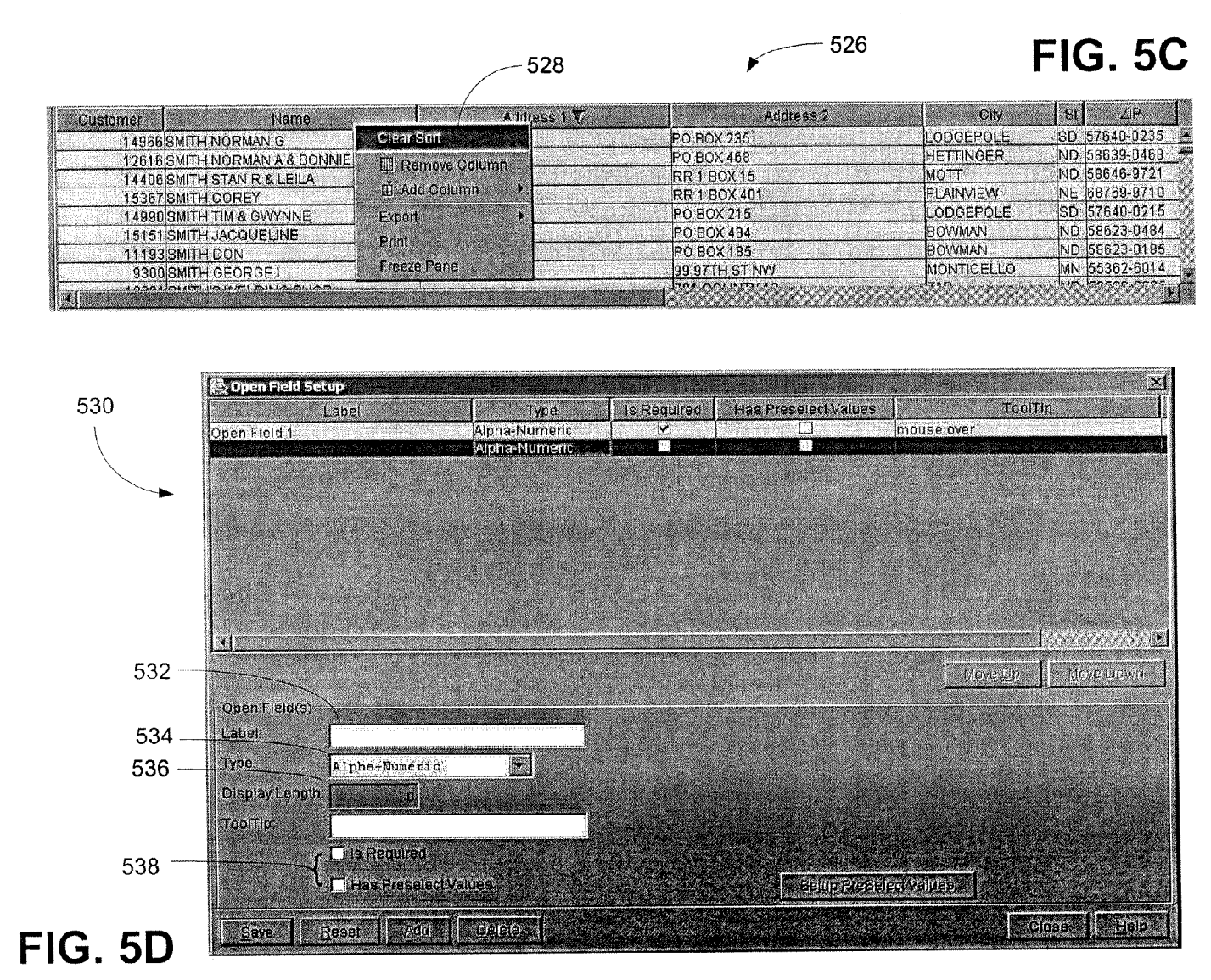

Referring to FIG. 5C, a table 526, which may be displayed within a summary area of a user interface screen is shown. Certain information about a customer such as a list of accounts or agreements may be illustrated in a tabular display. The present invention enables a user to customize such tables by adding or removing columns at run time. The fields of the table can also be sorted and individual panes can be frozen to allow panning. These settings are saved by operator. A selection of such features can be made through a menu 528.

Another feature of the present invention is the availability of open and customizable fields on most screens. Referring to FIG. 5D a display of a window in which an administrator can define a customizable field for display on the user interface screen is shown. The user interface screens of the present invention are customizable by end users that have the appropriate security access. Since it is very likely that not all fields that an organization may need could be anticipated and provided by the developers of iVUE, open fields which can be customized and incorporated into the application are provided as an added convenience and feature of iVUE. A label 532, type 534, display characteristics 536 and validation requirements 538, for an open field can be readily configured by an end user using an open field window 530 as illustrated.

In addition to the various features of iVUE discussed thus far, each customer, account, agreement and activity related to those entities can be associated with notes that are created by a CSR. The notes are stored with the appropriate record and can be utilized to convey additional information for which a field does not exist within the iVUE system. For example, the notes may contain an explanation for a given alert condition that arises concerning an account, such as, the fact that the customer has made contact and has arranged to stop in to make a payment.

Figure 6:
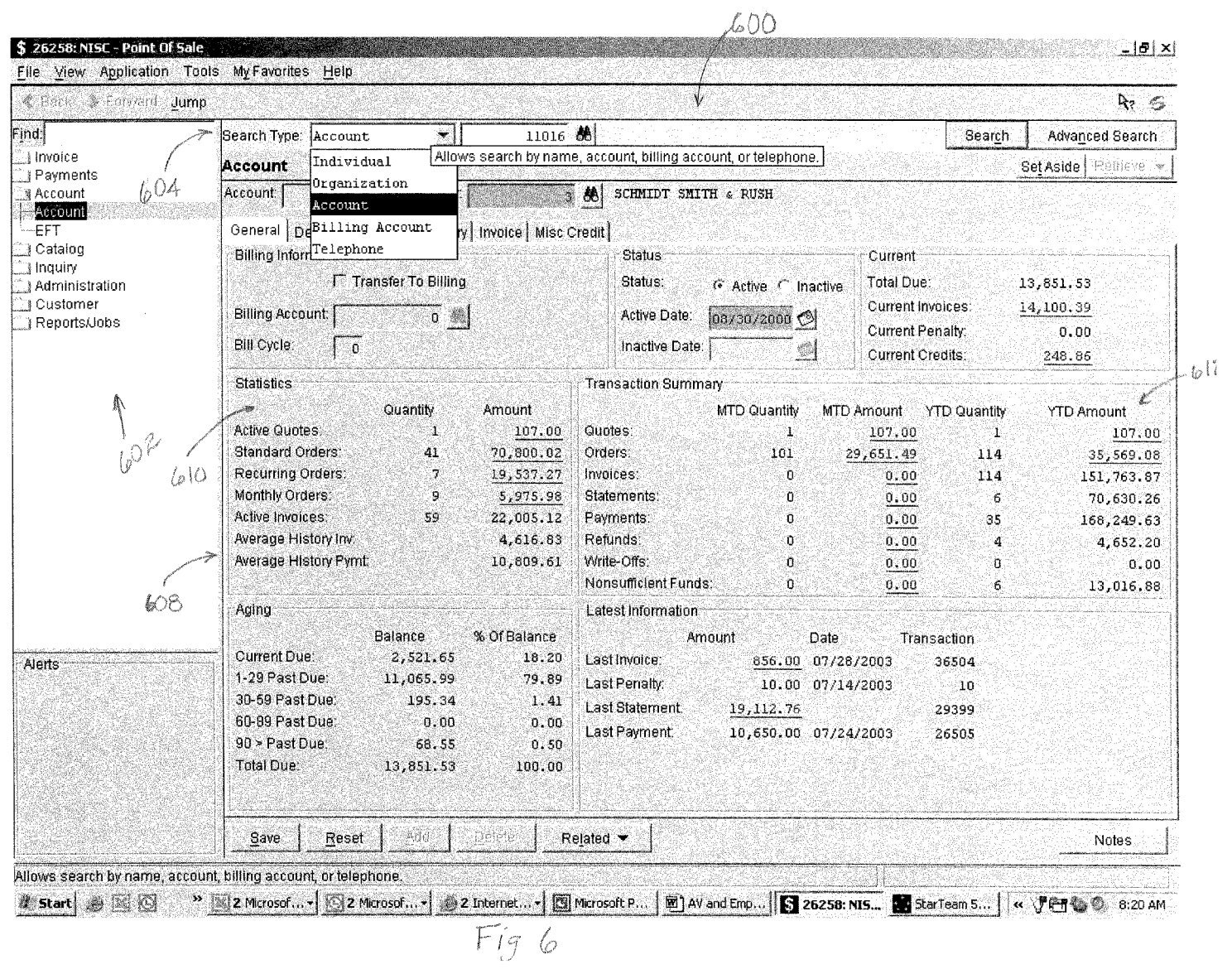

The above general environment description provides a segue to the following detailed discussion of the subject matter of this application, the POS invention. The POS system can be better understood upon examination of various user interface screen shots that reflect the system functionality. Referring to FIG. 6, a typical user interface screen is shown 600. The interface screen comprises a left navigation area 602, a search area 604, and a data content area 608. The left navigation area is accomplished by the left navigation framework, which defines the navigation scheme and what the selection of a given node or sub-node will provide and execute. The format of the data fields in the content area and the summary area are defined by the data repository frameworks. The data-binding framework controls the access and binding of the data in a specific format for presentation. The screen repository frameworks provide the over all format of the screens. The system provides for consistent navigation schemes, consistent data access and manipulation, and for a consistent look and feel for the user interface.

The left navigation function provides for a navigation scheme for overall customer management. The left navigation provides a navigation tool for navigating the user through various operations such as setting up customer information for a new customer or for changing or viewing customer information for an existing customer. The navigation tool also provides for customer financial account review and access. The navigation tool also provides the ability to handle invoices, handle payments, as well as market, sell, modify and/or bundle new services and/or products. The navigation function can also be customized. The left navigation is also a navigation tool for accessing pending orders, accounts receivable, adjustments to invoices, and for generating reports. The POS application allows the user to manage their customer base from a single point of entry, always keeping a customer-centric point of view, while viewing and managing the entire spectrum of matters relating to providing and maintaining products/service to the customer.

As mentioned above POS interfaces to General Ledger, Work Order, Purchase Order, Material Inventory, Cash Register, Accounts Payable, Payroll, Installment Loans, the Utility and telecommunication applications. The invoicing function of POS supports Quick Sale Functionality, Supports Sales, Returns, and Trade-ins, Bar Code Scanning, Credit Card Swipe and Authorization, Return Tracking, Cash Drawer Options, Allows for multiple accounts receivable general ledger accounts, Defaults by Customer or Account Type, and Taxing information controlled at the line item level.

POS can accommodate (Multiple order types) as shown in the statistics window 610 of the content area 608: standard, monthly, recurring, and quotes. A transaction summary window 612 in the content area 608 provides month-to-date and year-to-date customer transactions such as quotes, invoices, refunds, write-offs and other transactions as shown. The POS invention provides various functions as follows. The POS Product Catalog function provides Serialized inventory, Flexible Pricing Options including unlimited price groups, Warranty Tracking, and Interfaces to Inventory and Non-stock items. The POS Account Function Shares a Central Customer with utility applications or telecommunication applications in the iVUE suite. POS also provides for notes and user-defined fields by account, Detailed customer information and statistic tracking, Account and Tax defaults, and User Defined Payment Terms. Hyperlinks are provided for easy drill down on many of the transaction summary as well as the statistics 610 and current and latest information sections.

The POS Accounts Receivable function provides for two statement formats: Balance Forward and Open Balance, Custom-defined invoice and statement messages, Rapid add payments and reverse payment functionality. Multiple banks for payments can be utilized as well as Electronic Fund Transfer (EFT), and transfer to billing option. An interface from Payroll supports the payment of invoices for customers who are employees by way of deductions. Complete credit tracking functionality allows for automatic or manual distribution to open invoices. Credit distribution can be reversed or refunded through the legacy Accounts Payable system. Write-off functionality is available as well as the support for NSF transactions.

Multiple Business Entities can be tracked by the POS system such as a utility entity, a telecommunication entity, and a water heater retailer. Automated Due-To/Due From General Ledger Entries can be tracked between divisions which is particularly useful when consolidated billing is utilized. Separate GL Accounting can be setup by Division which is useful for separate reporting by Division. Customized form layouts by Division can also be created.

POS can perform periodic prints or prints special forms on demand such as invoices, orders, receipts, statements and billings in a consolidated or non-consolidated format. Penalty calculations and delinquent messages can be setup to print on the statement as determined by the account tracking functionality. Standard Reports can be customized to fit each company's needs and can be generated from a single point of entry POS environment. Order and invoice groups for reporting purposes can be customized. Historical Open Balance Reporting is also available.

For example, FIG. 7 reflects a screen where the user has navigated to Invoice-Sales—where Line Item 704 and serial 706 has been selected in the summary and the content area. Also in the summary area, all line items are shown for the account. As on this screen, many of the screens incorporate hyperlinks, such as the Total Tax hyperlink 708. The pop-up screen for the hyperlink is shown as FIG. 8. This screen supports the ability to change the tax authority for a particular sale and/or order. Taxes can optionally be overridden to account for rounding differences between a manual "field" calculation and the computer based formula. Also, shown in FIG. 7 is a button for a set aside function 710, where the user can set aside work being performed for a given customer to perform a different customer's task, and then later retrieve the previous work product. These browser-like functions combined with a Windows-Like graphical environment provide for a very robust user interface tool. In the content area the serial items are selected for viewing, showing the whole sale quantity and the unit cost. The serial items can be selected to be moved to the selected items window, similar to an online "shopping cart". There are also tabs that can be selected for viewing descriptions, costing information and warranty information. The summary window showing the line items selected is customizable such that rows of information can be added or deleted by selecting the "Add Row" or "Delete Row" buttons as shown.

Referring to FIG. 9*a*, the left navigation area 602, a search area 604, a summary area 606 and a date of content area 608 is shown. The left navigation indicates that the user has navigated to the account sub-node. On this screen, the user has the ability to select the search method which includes searching by individual, organization, account, billing account and telephone number as shown by the pull down window 902, which is shown in FIG. 6 as well. The summary area reflects the account number and the entity name as well as the general status of the account. The content area reflects the statistics and transaction information. There are various hyperlinks in the content area and the summary area that can be selected by the user to call up a secondary window showing more detailed information about the hyperlink item selected. For example, referring back to FIG. 6, in the content area in the section for the transaction summary, a hyperlink has been established for the year-to-date amount for the orders. In the summary area, there are a series of tabs that can be selected by the user for viewing various information in the content area and the summary area. The current selection is for general information which as indicated above provides general status information as well as statistical and transaction summaries. Various types of account information can be examined when the account node is selected such as the default information shown selected in FIG. 9*a*. As shown, other selections are available such as general account information, address, account history, invoice, and miscellaneous credit information. These selections are made by selecting the appropriate tabs, as shown. FIG. 10, shows the history tabs 1002 selected which provides the historical invoices 1004 and the historic bill cycle 1006. All customer account information can be viewed from a single point of entry as well as the details of an individual account. Default information can be viewed as well as account history in order to manage customer accounts, for example, managing the billing. Drill down capabilities are available on the total invoices by Period as well as on the History Bill Cycle Statements.

Figure 11:
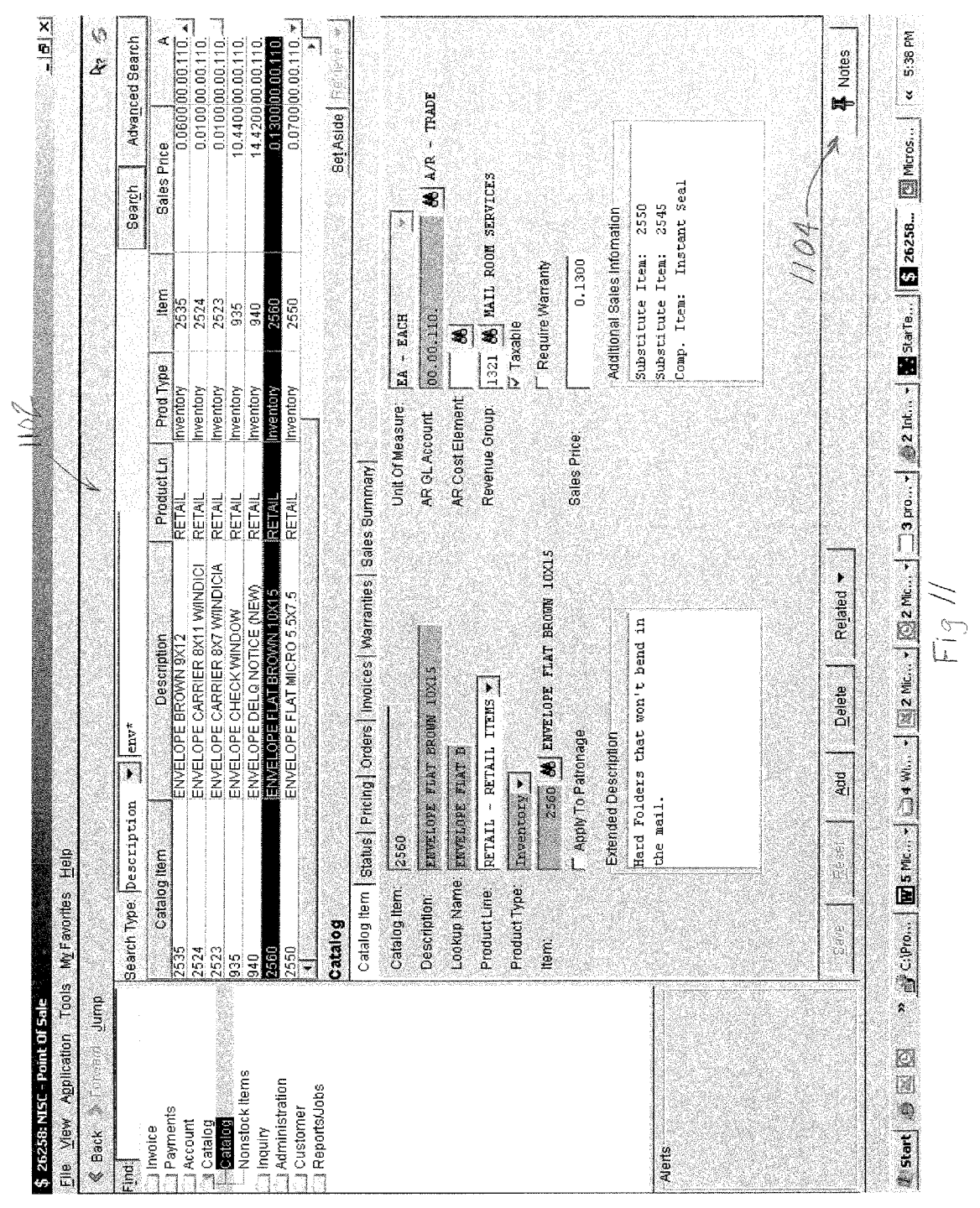

Referring to FIG. 11, a screen shot 1102 is shown which reflects a user navigating to the catalog sub-node. The search type selected is that of description and "env*" (where '*' equates to a wild card search) for envelope is the search parameter entered and catalog item 2560 is shown highlighted which changes the content area to reflect information about the selected catalog item. The catalog item tab in the content area is also selected which causes the content screen to reflect general information concerning the catalog item. The Catalog Item is the main driver for the line item information and ties to Inventory, Non-Stock, and Other Items. The catalog item is used for defaulting in warehouse, unit of measure, unit price, revenue group, stores expense, unit costs, AR, COGS, Revenue, Inventory, Stores Expense, and Discount GL accounts setup for the part entered. There is also a notes button 1104 located on the bottom right portion of the content area which allows the user to set up date based notes that can be added to the various screens such as the account screen, customer and catalog screen. This screen allows a CSR to quickly setup maintain, and inquire on both stock and non-stock items as well as establish pricing models. In the content area the CSR can also view the status of available inventory for the item, view orders, invoices and sales summary for a particular item along with warranties by simply selecting the appropriate tab.

Figure 12:
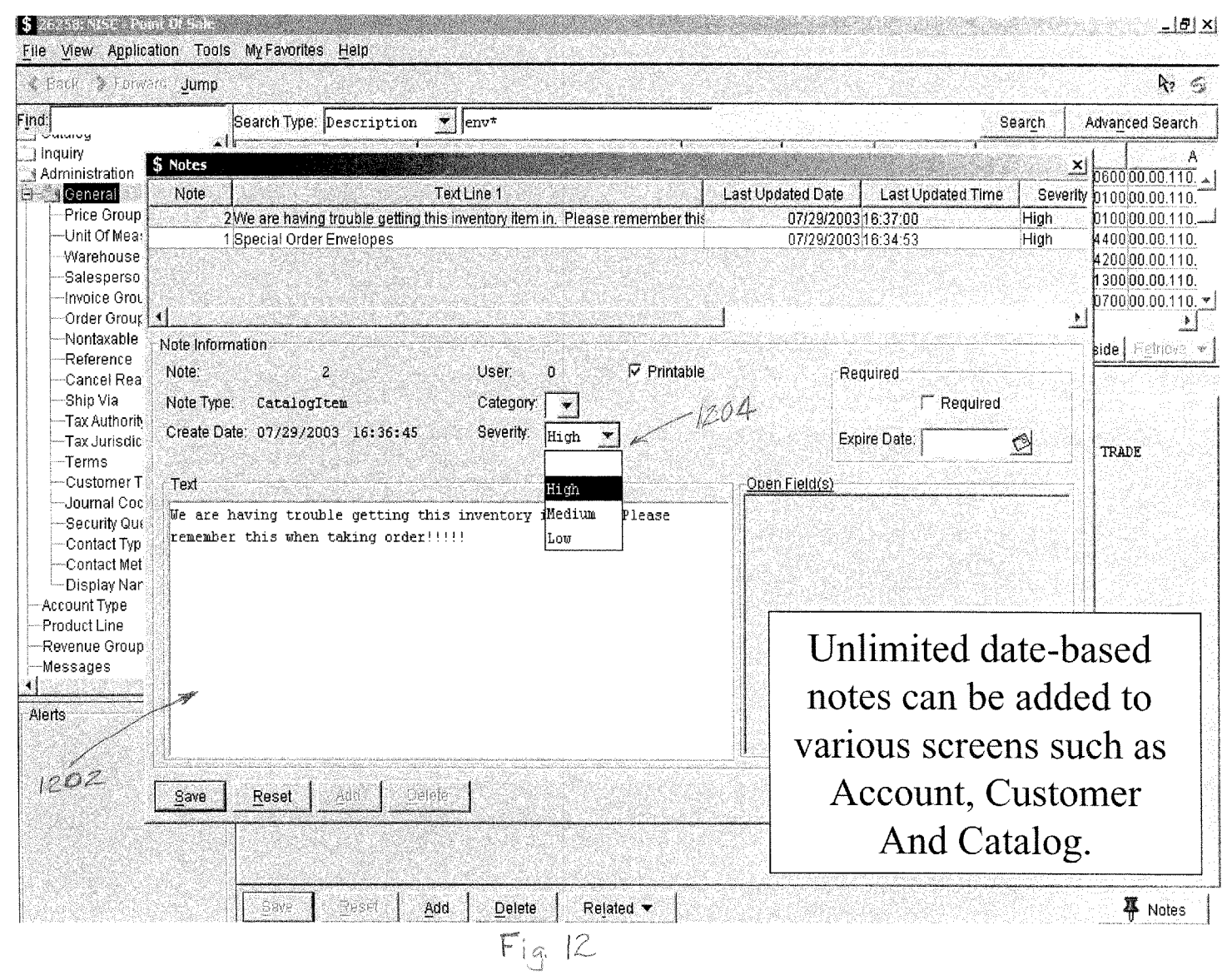
Figure 13:
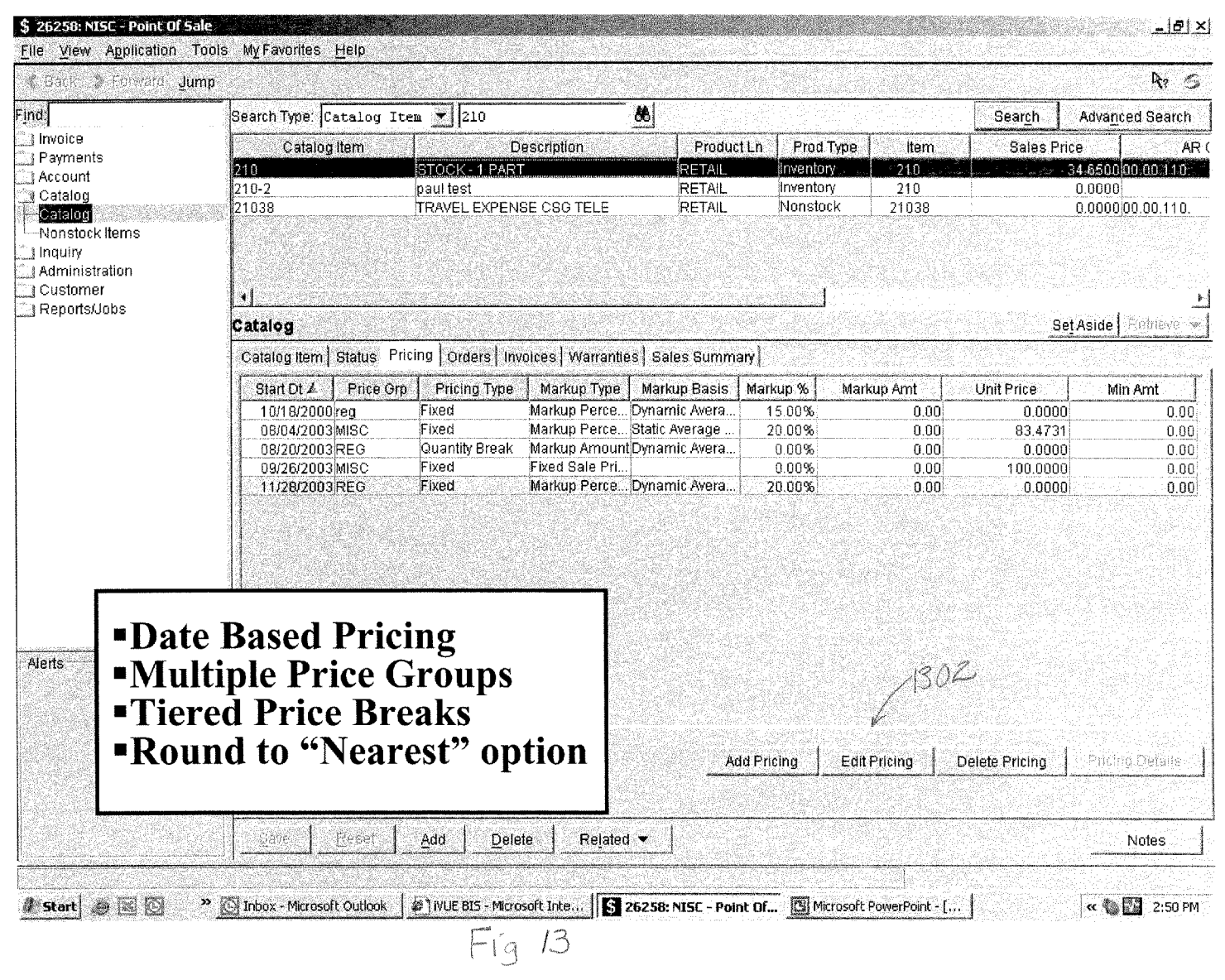
Figure 14:
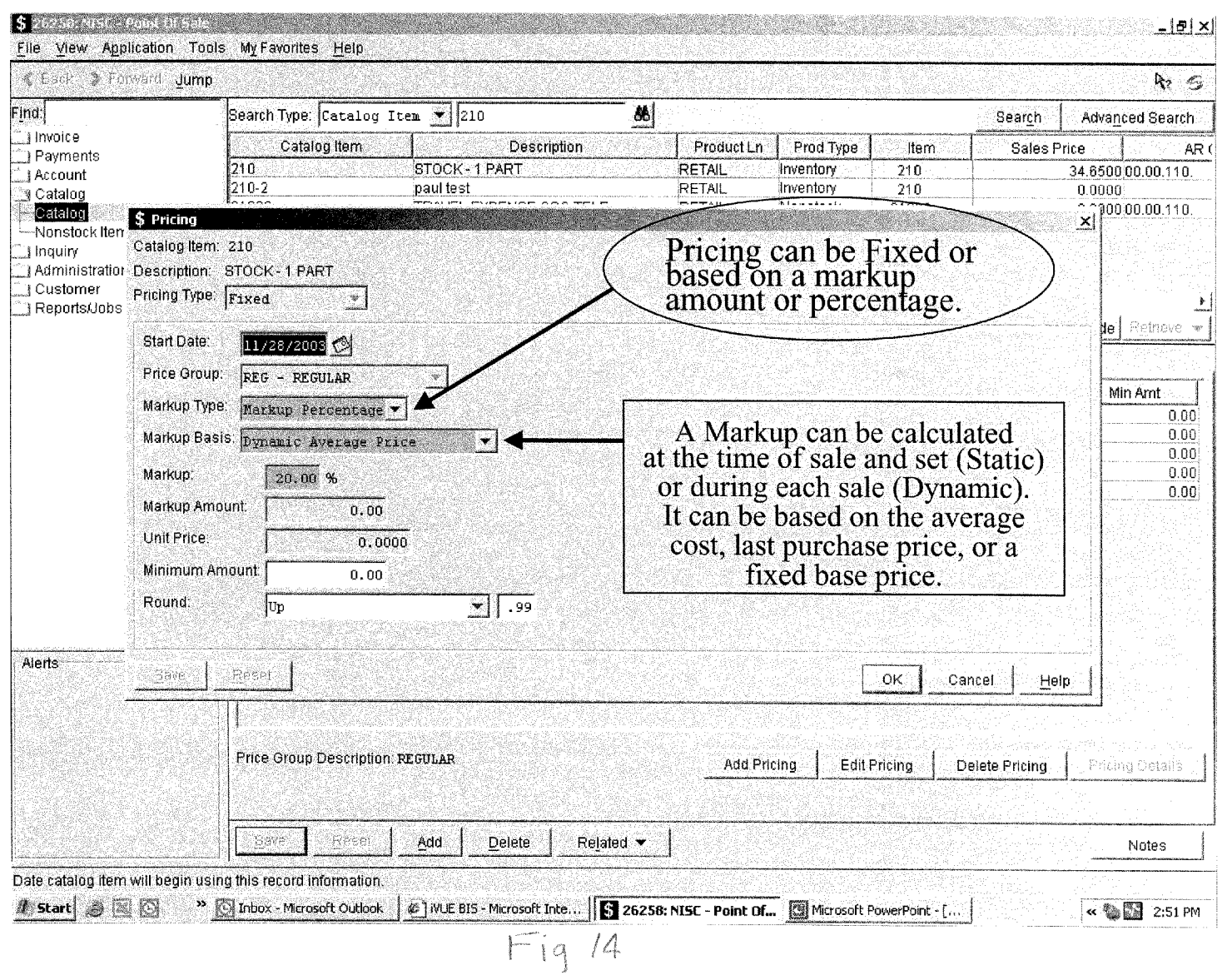

FIG. 12 reflects the pop-up window where a note screen 1202 is displayed for setting up multiple notes concerning a catalog item. This feature expands and customizes the information that can be provided to the CSR. The priority of the date based note can also be set to a level of severity of high, medium or low as shown by the pull down window 1204. FIG. 13 shows the pricing tab selected where pricing information is provided in the content area for the catalog item selected in the summary area. Also in the bottom right corner of the content area are buttons 1302 for selecting options to add pricing, edit pricing or delete pricing is available. The user can add various pricing scenarios as well as deleting existing pricing. A sample of the edit pricing window is shown in FIG. 14 which is accessed by selecting an edit button when the pricing is being edited. Types of pricing supported include; Date Based Pricing which allows the setup of pricing in the future without affecting the current pricing model; Fixed Amount and Percent, Quantity Break and Tiered Quantity Breaks, each with markups based on List Price, Average Cost, Last Purchase Price, or Actual Serial Item cost, which can be done dynamically with each sale or calculated and stored as a fixed price. All of these pricing models are tied to a Price Group which is then associated to a Customer's account. Therefore a customer's account profile can be examined by the CSR and determine what pricing may be available to the account.

Figure 15:
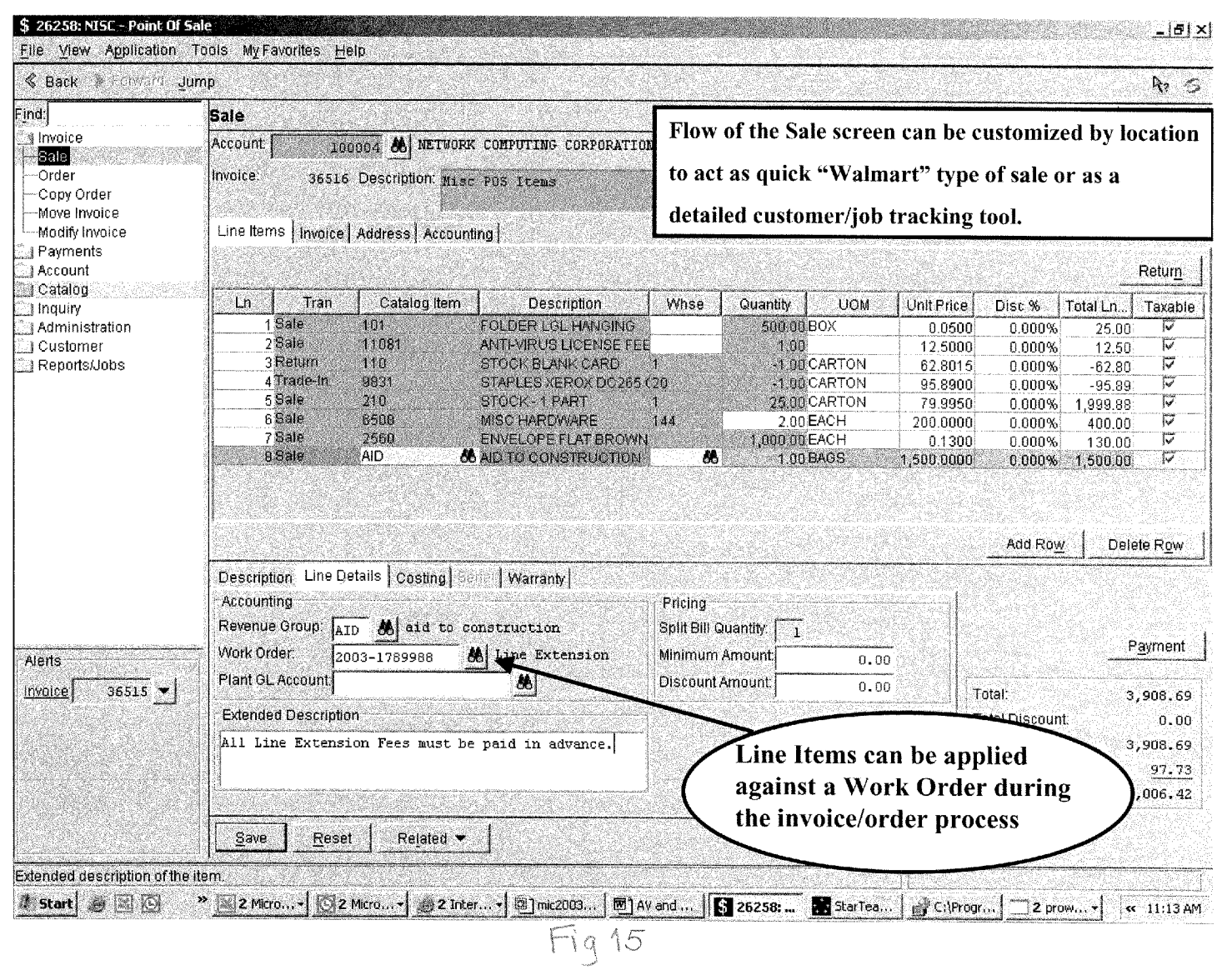
Figure 16A:
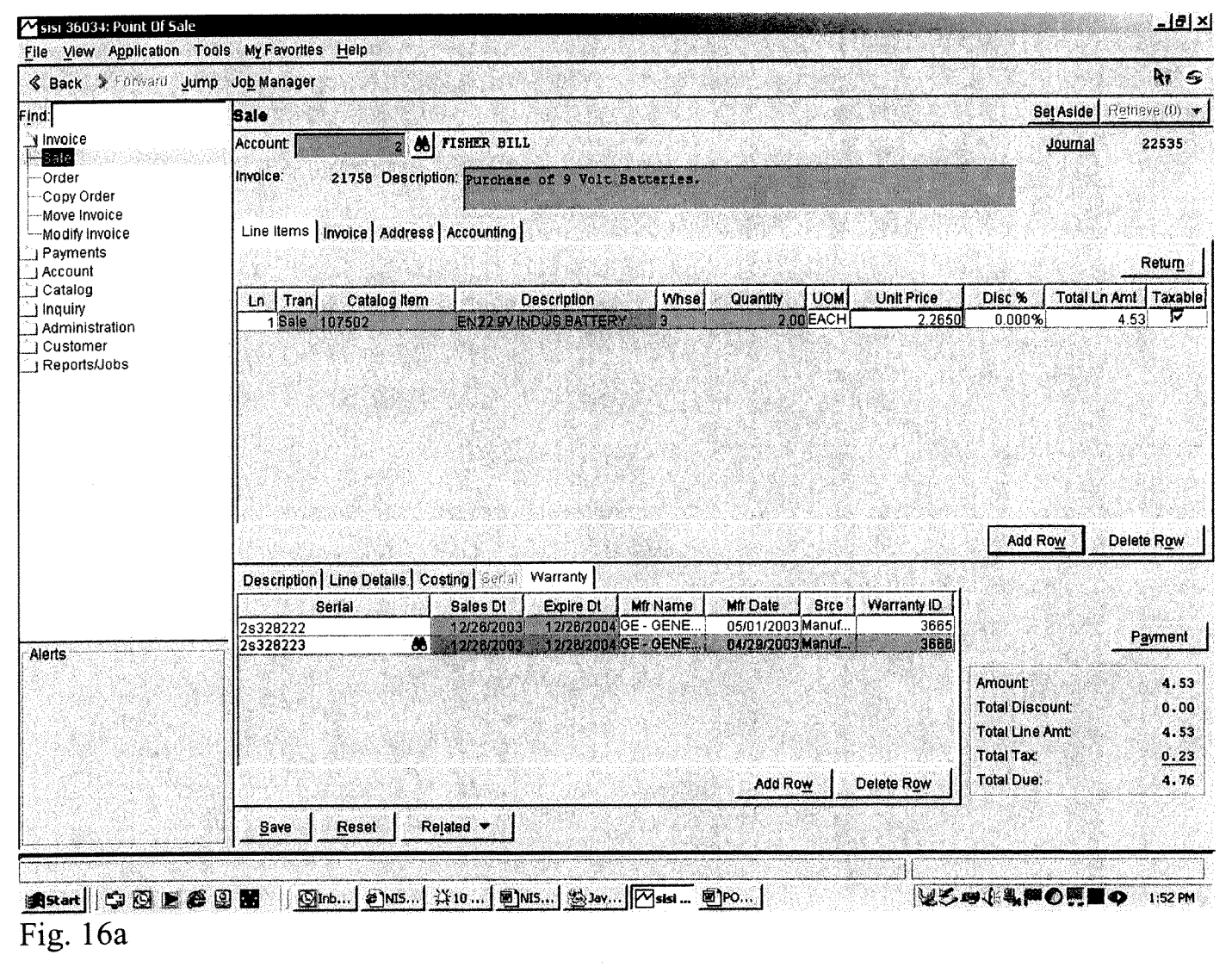

Referring to FIG. 15, the screen shown indicates that the user has navigated to the invoice-sale sub-node. The flow of the invoice-sale screen can be customized to act as a quick counter sale or as a detailed customer/job tracking tool. The invoice-sale screen as shown in FIG. 15 has a customer account in view with an invoice description and the invoice having multiple line items. The line items for the invoice are shown in the summary area where the line item tab has been selected. In the content area of the screen, the line details tab has been selected to provide for the line item highlighted in the summary area. The line item as indicated in the content area can be associated with a work order during the invoice/order process. An extended description of the line item can also be provided. Costing and warranty information can also be viewed when the appropriate selections are made. Referring to FIG. 16, the costing tab in the content area has been selected, which allows the user to review the unit cost and the margin for the item being sold, and select the method of applying stores expense at the time of sale. Warranties shown in FIG. 16a are established in different ways, the first is where the catalog item is marked to require warranty information at the time of the sale supporting the manufactures warranty as a customer service tool with a forced navigation to that screen, and the next is when the company offers extended warranties as an additional revenue source. The payment button in the content area can be selected by the user causing a payment pop-up window to appear as shown in FIG. 17. This option allows the user to put invoices on account, or accept multiple forms of payment such as cash, checks, credit cards, etc. If miscellaneous credits exist they can be optionally applied against the invoice at the time of sale.

FIG. 18, is a screen where the user has navigated to the Invoice-Modify Invoice subnode where a CSR can inquire or modify an invoice. The modified invoice is immediately reflected in the Inventory, General Ledger, Work Orders, and Point-of-Sale. An invoice can also be voided which will reverse all original transactions to the interfacing modules along with the ability to mark the order as reactivated. Upon completion of this task, the operator is free to modify the original order with all required modification prior to re-invoicing. All changes are audited for future reference. The penalty amount shown in the total amounts window has a hyperlink and the penalty hyperlink page is shown as FIG. 19. Penalties are generated automatically based on system define parameters where invoices are held on account beyond a set period in time. System calculated penalties can be modified and/or deleted. The penalty amount will be allocated proportionally across all lines of business based on the line item general ledger account numbers.

Figure 20:
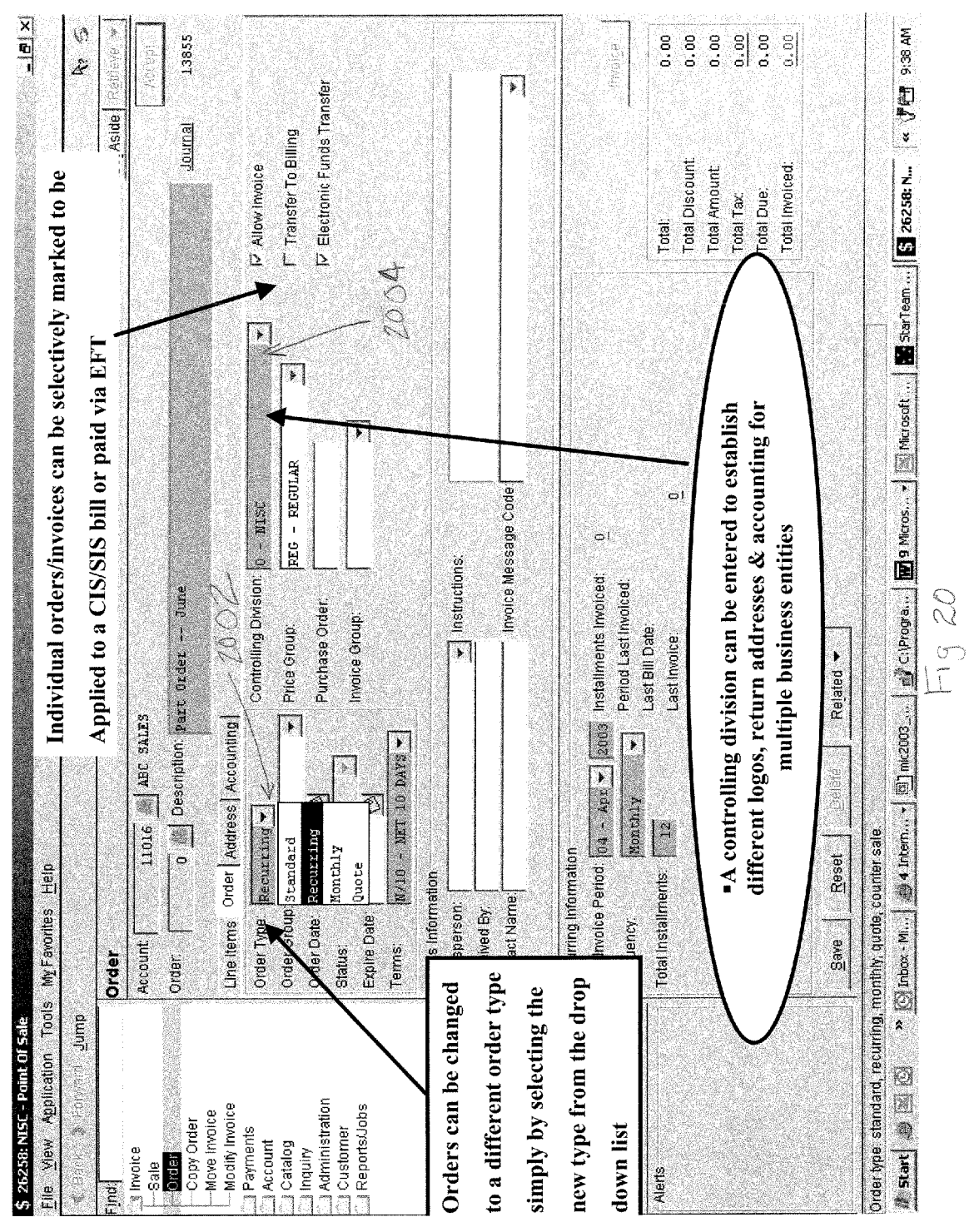
Figure 20A:
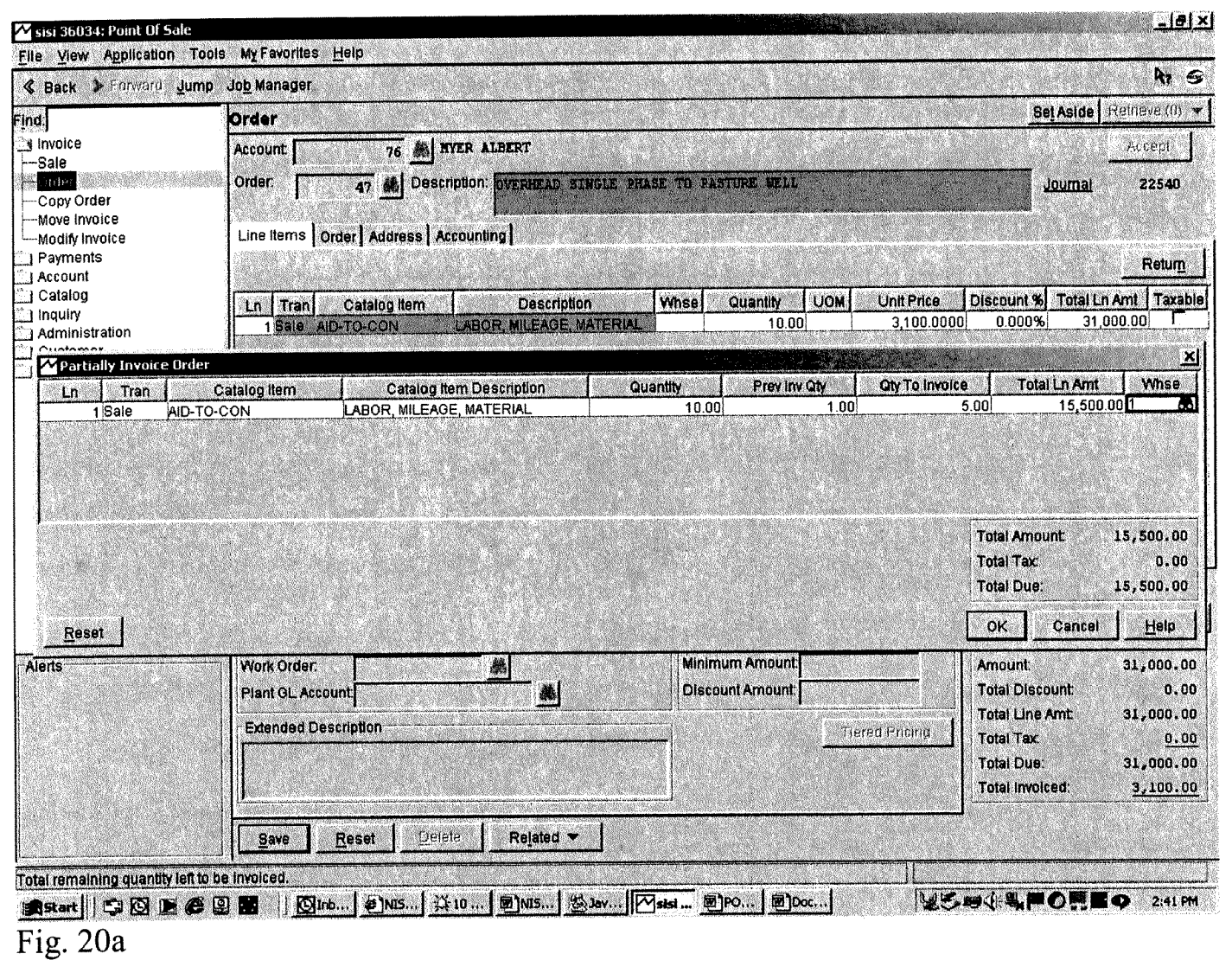

Referring to FIG. 20, a screen is shown where the user has navigated to the invoice-order screen. This screen allows the user to select different order types such as Standard, Recurring, Monthly and Quotes as indicated by the pull down menu 2002. Also the user can specify a controlling division to establish multiple business entities as indicated by data field 2004. Orders can be invoiced individually or by various selection criteria using a volume update process which can be run at any time. Order to Invoice creation process creates GL entries, updates material inventory, cash register, installment loans, work orders, and the customer's account the transaction was for. Invoices can be created in the current period or future periods. Orders can also be partially invoiced as shown in FIG. 20a.

Figure 21:
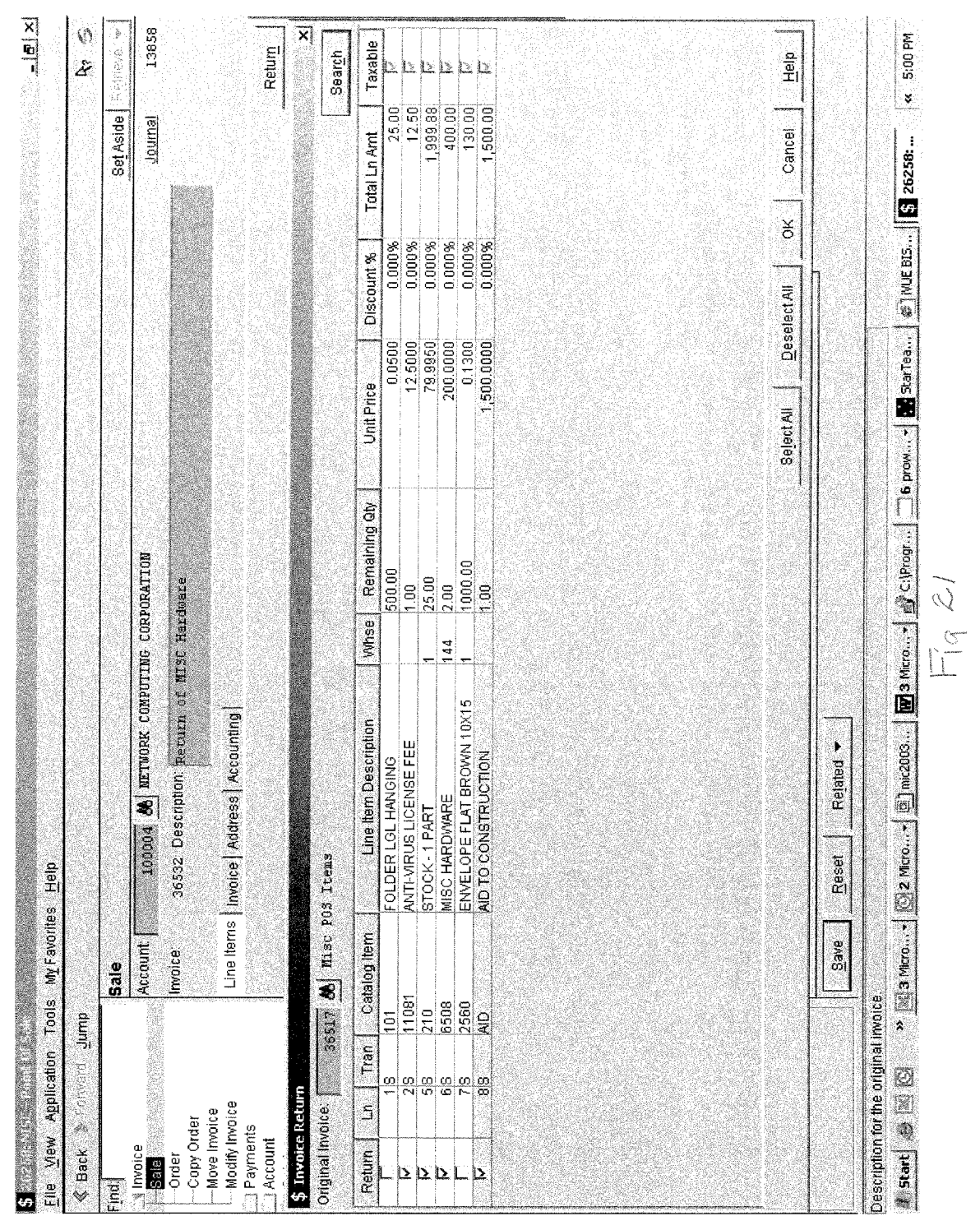

Referring to FIG. 21, the user can select the return button as shown in the summary area of "FIG. 7" which causes a popup window to appear for invoice return. The user can perform a return transaction utilizing this popup window. By checking the return box, all line items checked will be pulled into the sale screen. All stock items will be returned to inventory at the unit cost on the original sale and optionally with stores expense added. Stores expense represents the labor and overhead of maintaining items in inventory. A more accurate cost of each saleable item is represented when stores expense is used within the system.

Figure 22:
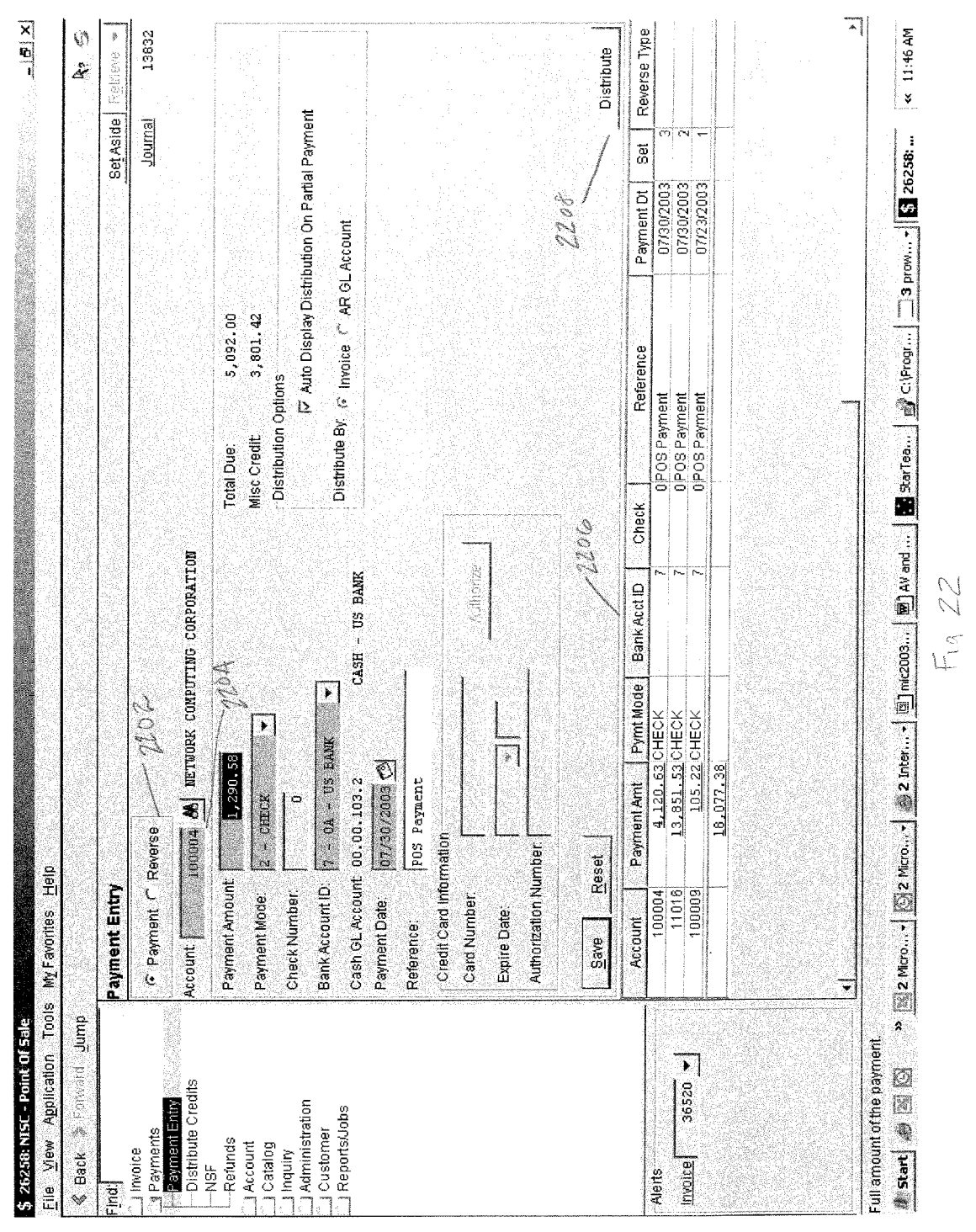
Figure 23:
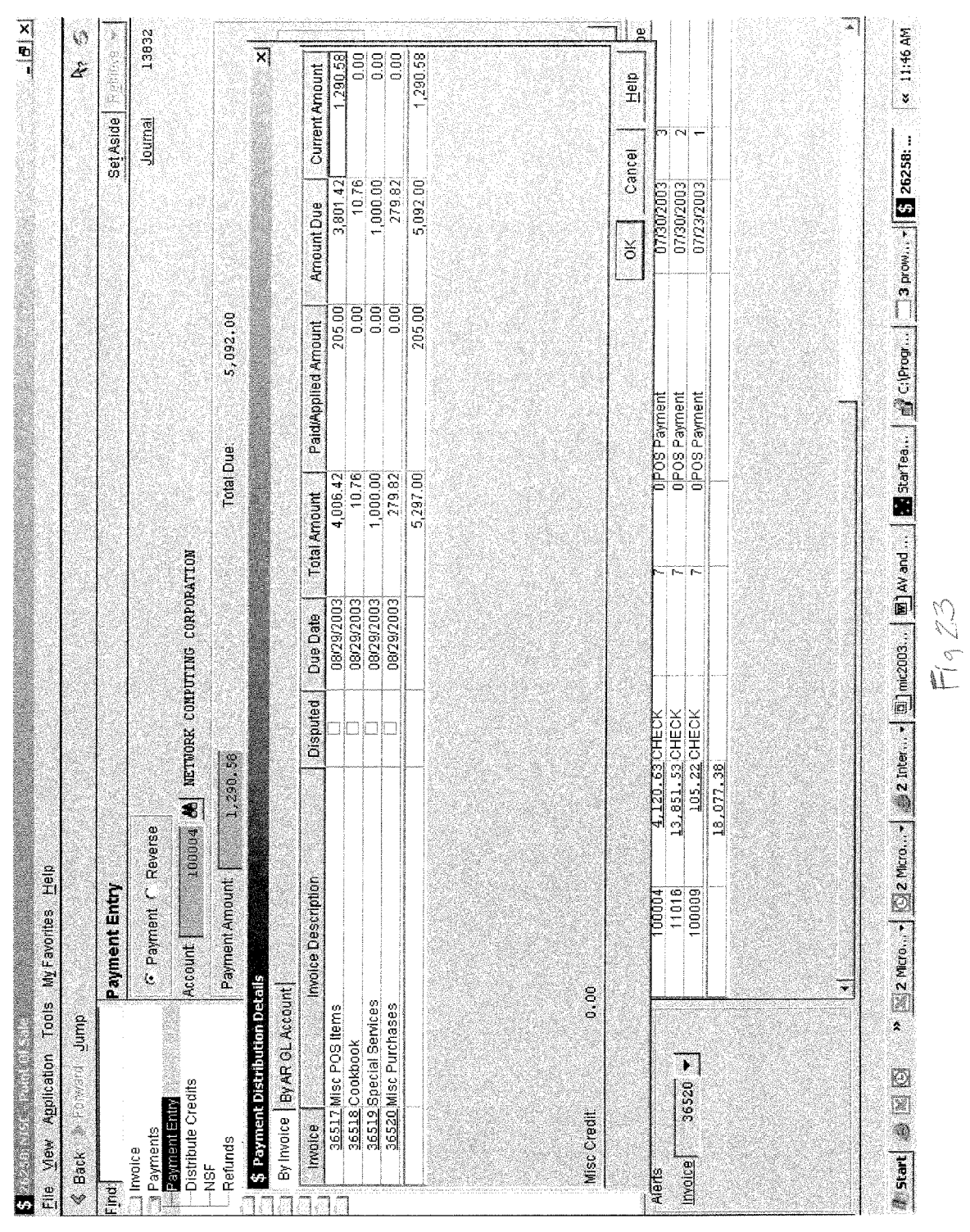
Figure 24:
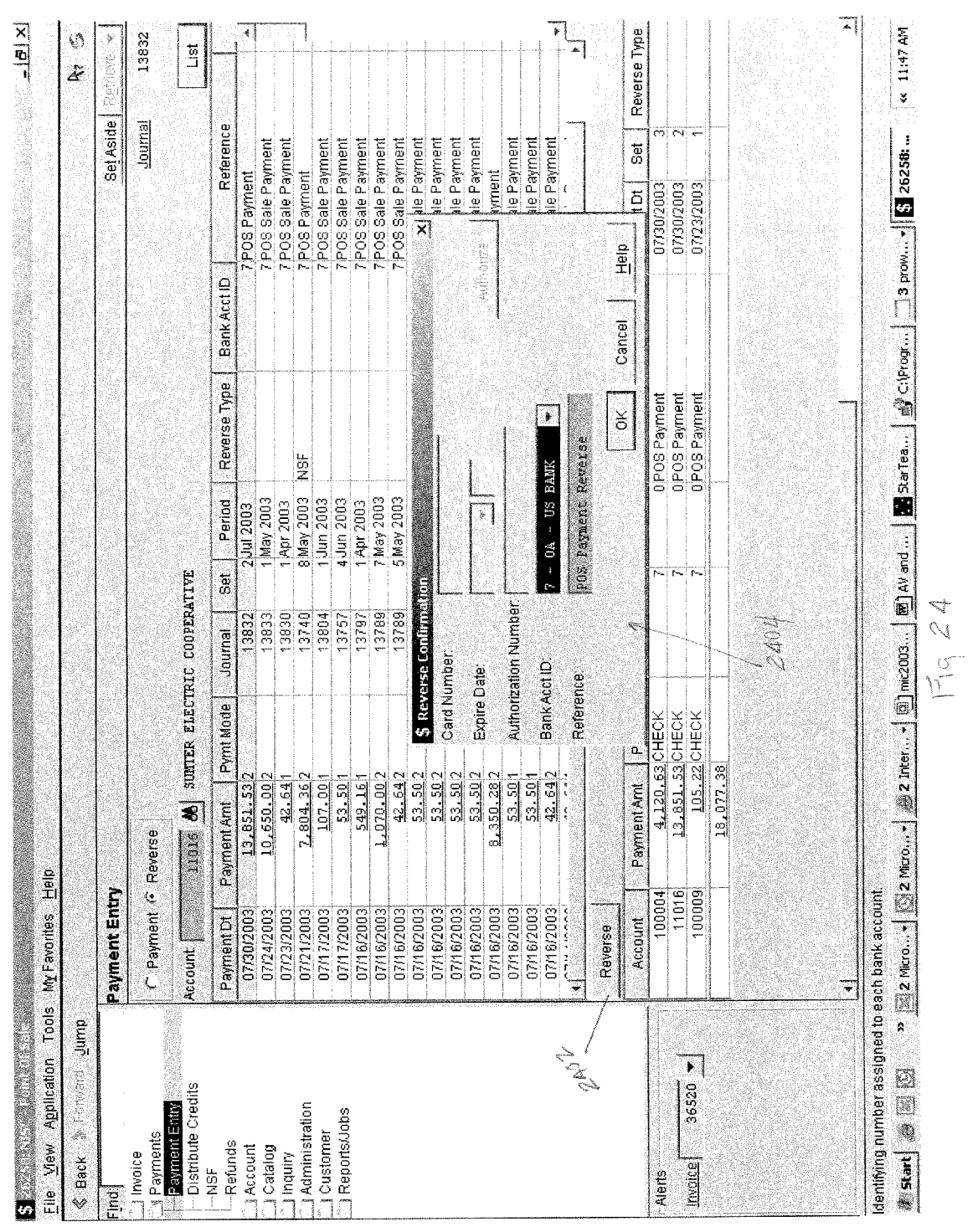

Referring to FIG. 22, a screen is shown where the user has navigated to the payments-payment entry subnode. The payment user interface functionality allows the customer service rep to handle payment entries and manage the distribution of credits and refunds. The payment entry screen shown in FIG. 22 allows the customer service rep to input a payment on account or reverse a payment. The payment and reverse functions are selected as indicated by item 2202 in the summary area. A specific account has been entered in field 2204. In the content area line item 2206 show the various other accounts where payments have been received within this session (otherwise known as a journal). A distribute button 2208 can be selected which causes a payment distribution screen to be displayed as shown in FIG. 23. The payment distribution detail screen is operable to allow the customer service representative to distribute a payment across various invoices and/or the Account Receivable GL account The payment will be applied to the oldest invoice to newest as a default. FIG. 24 shows the screen for the reverse payment option wherein the summary area of the payment history is shown for a given account number. A payment within the payment history can be selected and reversed by the customer service representative. The reverse button 2402 can be selected which would cause the reverse confirmation window 2404 to be displayed. This functionality provides the customer service representative with the full capability of reversing any given payment for any account.

Figure 25:
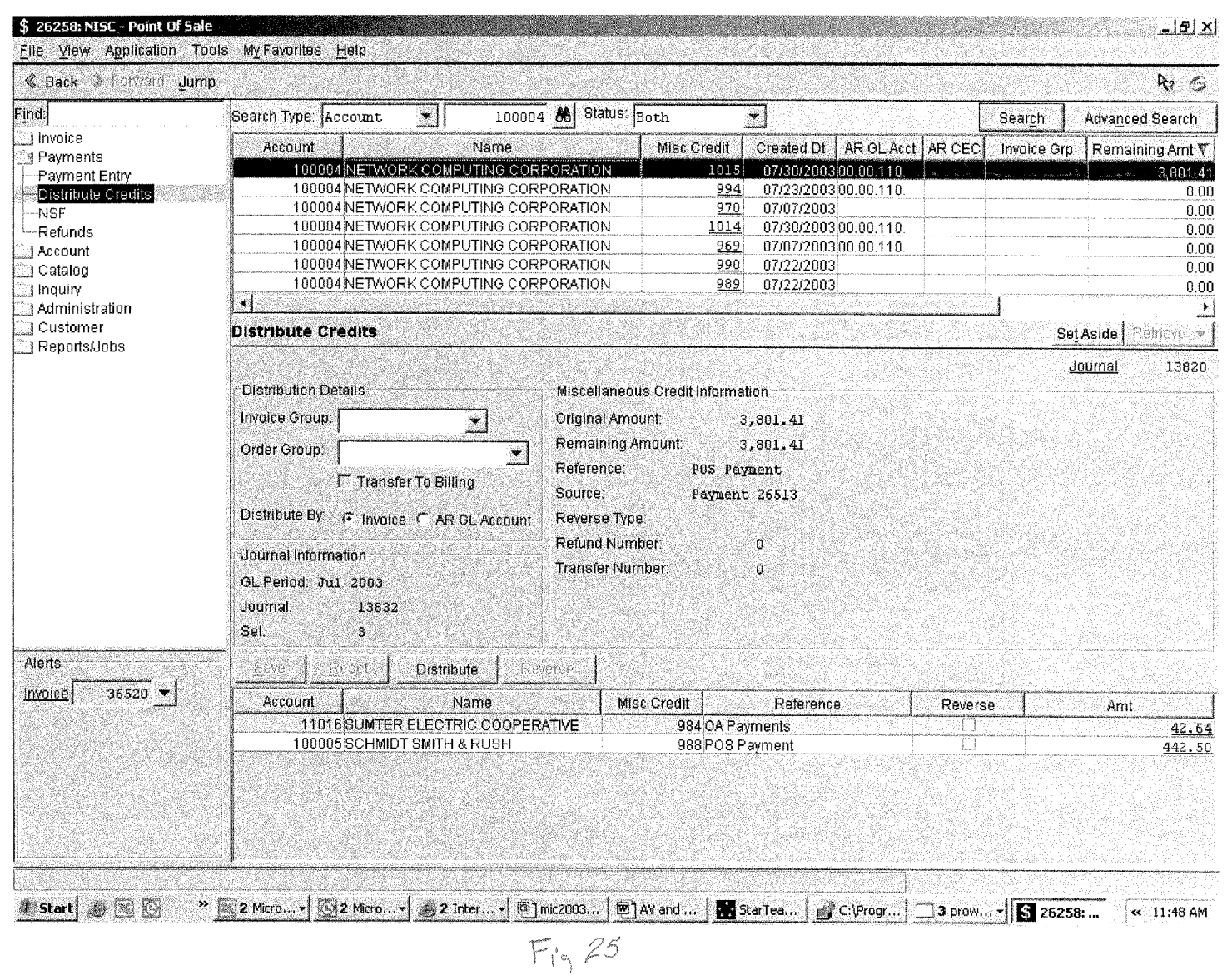

Referring to FIG. 25, a screen is shown where the user has navigated to the payments-distribute credits subnode. The functionality of this user interface allows the user to distribute credits across various invoices and/or Accounts Receivable GL accounts similar to distributing payment to an account. The reverse button (2502) will allow for reversing of the distribution which occurred when the credit was applied. The miscellaneous credit balance will be reflected with the additional amount reversed.

Figure 26:
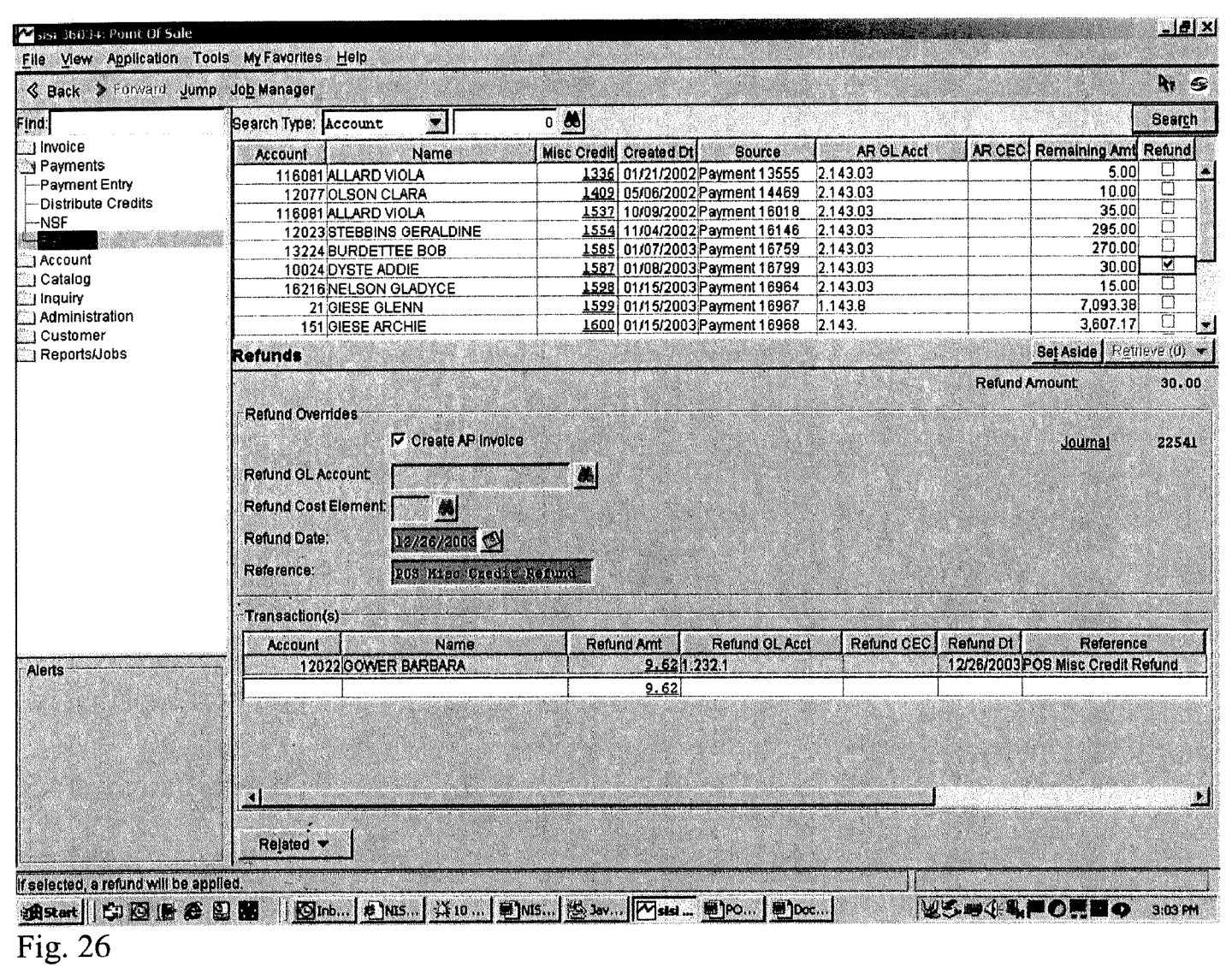

FIG. 26 shows a screen where the user has navigated to the payments-refunds subnode. The refunds user interface functionality allows the customer service representative to issue refunds to a customer of a given account where miscellaneous credits exist on Account. The refund will generate an invoice to the legacy accounts payable system where a check will be issued to the customer.

Figure 27:
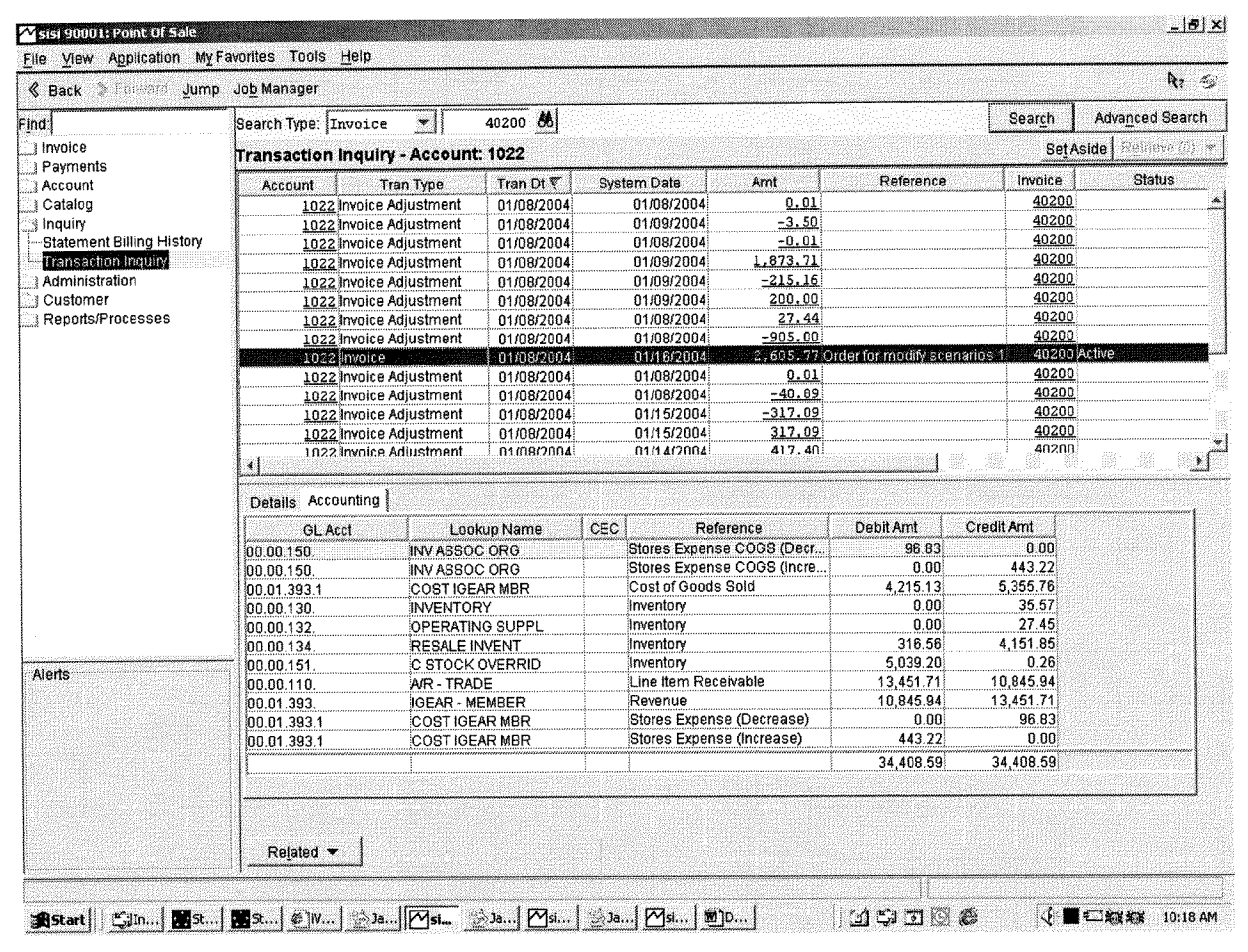

Navigation to the inquiry node provides a user interface screen as shown in FIG. 27 where the transaction inquiry subnode has been selected. The transaction inquiry functionality provides the customer service representative with the ability to examine the transaction history for a given account. When hyperlinks are selected from the account screen the drill down screen is represented by the transaction inquiry screen with the appropriate filter set for displaying historical information as it relates to, invoices, payments, and so on.

Figure 28:
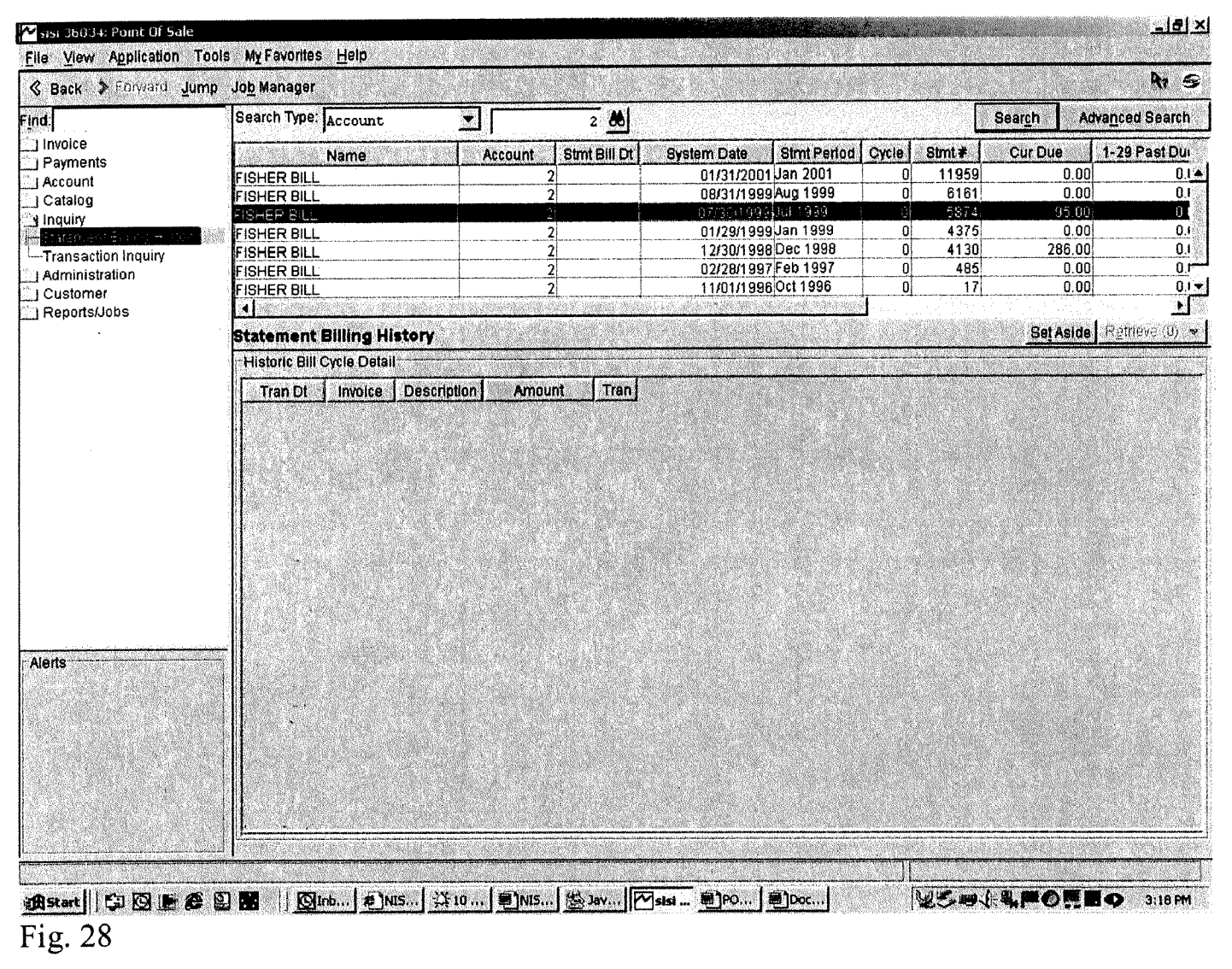

The statement billing history shown in FIG. 28 is also a subnode that can be selected which provides the billing history for a given account. The user interface inquiry functionality allows the customer service representative to readily respond to customer inquiries concerning billing and transactions. Various hyperlinks exist on the statement line items which provides for more detailed information.

Figure 29:
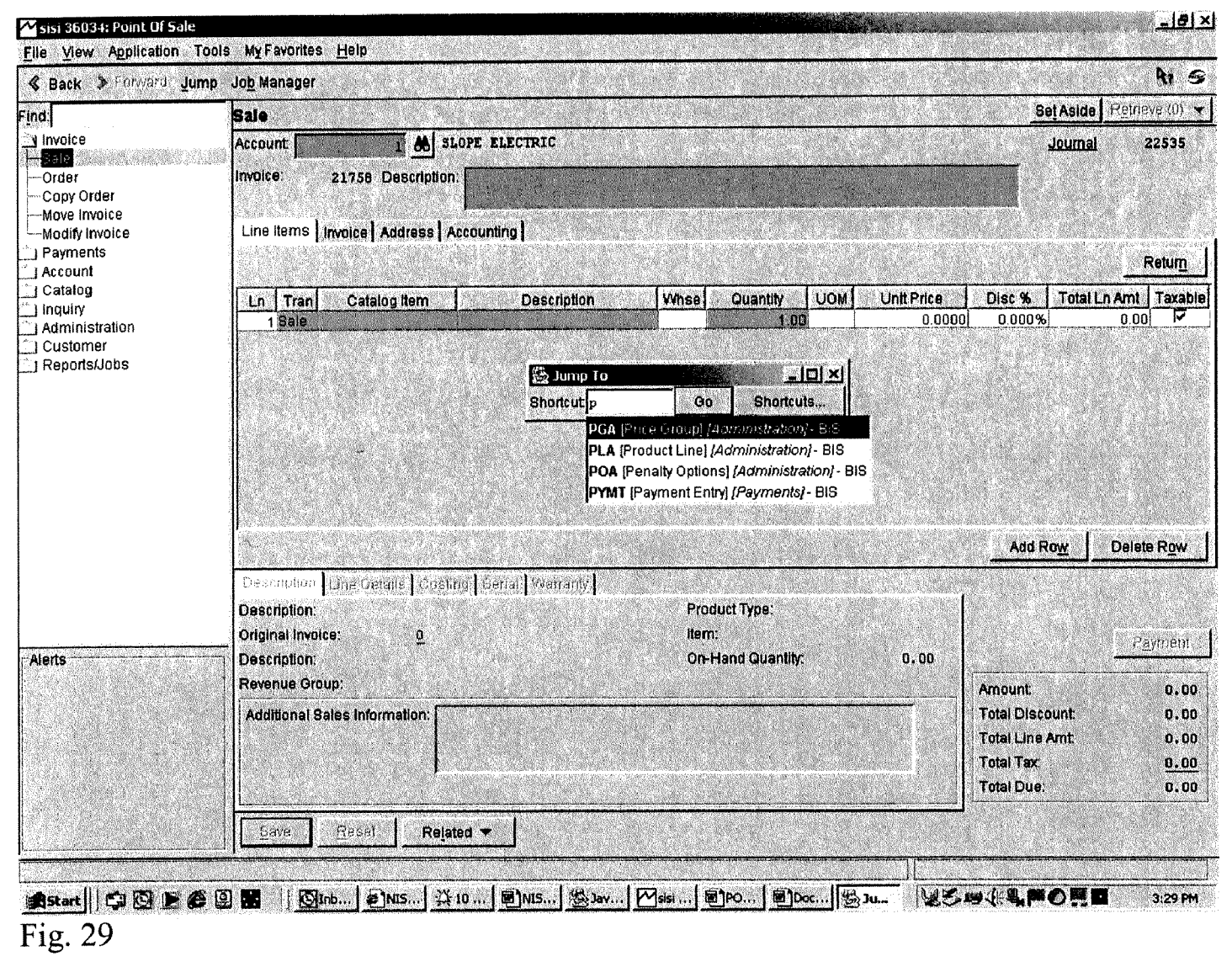

The POS system also incorporates a jump Box Screen function FIG. 29 where the user via a prompt can select, by entering a name or select by a pull down menu, a screen for viewing. Typing a 'P' displayed all functions which begin with the letter 'p'. Customized shortcuts are defined and unique by operator by simply selecting the Shortcuts button on the Jump To screen. When is selected via the jump box prompt, the view switches to the selected screen.

Figure 30:
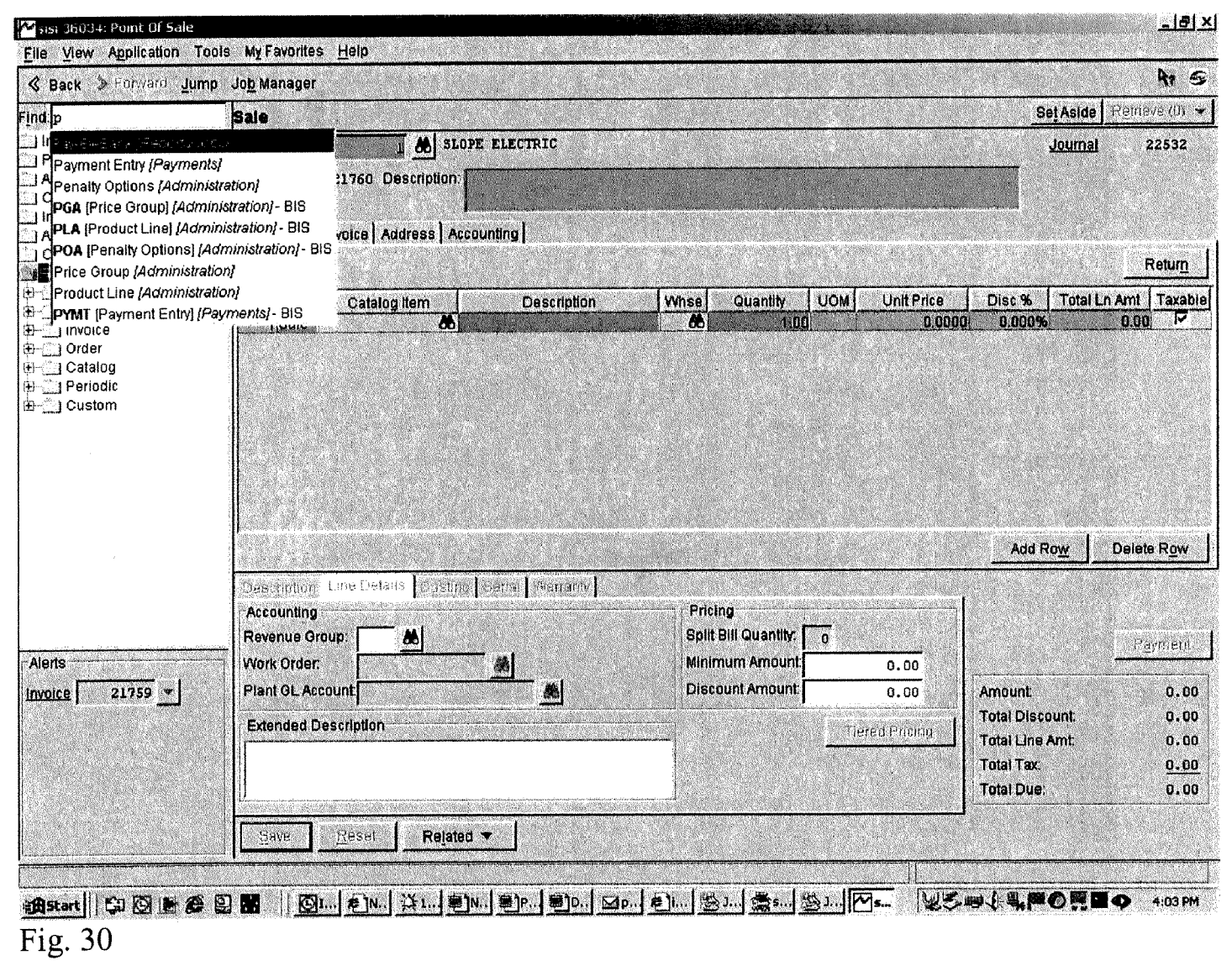

The POS system also incorporates a Find Screen function FIG. 30 where a user can search for a desired screen. The POS system also incorporates Hyperlinks, which allow the user to call up a screen, which provides more detail about or more functionality for the hyperlink item. There is also a way with POS to extend the data model where open fields can be created for customized tracking which can be required entry. The POS system will also allow the user to Jump back and forth between catalog screen and account screen. As invoices are created, an Invoice dropdown list is available (3002) as part of the Alerts containing all invoices that were entered into the system during the operators current session. By selecting one of the invoices from the dropdown list, the operator will be navigated to the Modify Invoice screen.

POS system incorporates a job manager function where all reports and/or processes are administered. The job manager supports many different output types such as Screen, File, Printer, CSV or E-Mail. In addition, reports and/or processes can be scheduled to run immediately or in the future as well as recurring based on user preferences. All reports and/or processes have filtering criteria providing the operator the utmost flexibility when retrieving data from the POS system. In addition, the operator is able to support the creation of custom reports and include them as part of the left navigation system to seamlessly integrate into the POS system.

The system can be set up to default off customer account or sales location, which can vary functionality. There is also a work order module for servicing such a customer requesting a service that is not currently available at the customer's location (e.g. a cable line does not run out to the homesite). The POS system can allow for the Possibility of dividing cost between customer and service provider. The automated booking function that keeps account between various divisions of a service provider (e.g. service provider provides landline and wireless) as to who collected money and as to who owes who what. There is also a possibility to set default values for any field and customer preferences for any field you want to have set values. Recurring reports can be scheduled and generated by POS. In addition to the customer-centric navigation tools and the browser-like functionality the POS system provides various order tools and workflow tools that can be customized by the user. The major graphical user interfaces are always a click away utilizing the left navigation function and many other screens are accessible via hyperlinks, buttons, jump to functionality, the related screen function all while keeping the customer in view.

The POS system provides a robust graphical user interface with browser-like functionality and Window-like functionality, which has a great advantage over the typical segmented character interface systems for the telecommunication industry. POS provides the ability to create customized workflow, which is not provided by current systems. POS provides tools for real-time marketing, bundling, selling, and setting up of customers and accounts.

The various features and screen examples shown and discussed above illustrate the novel features of the customer care system of the present invention. A user of the present invention may choose any of the above features or an equivalent thereof, depending upon the desired application. In this regard, it is recognized that various forms of the subject systems could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

The invention claimed is:

1. A system for providing an AR/POS graphical user interface compnsrising:
   a customer care computing system having an executable AR/POS application operably stored thereon where said AR/POS application is operable to control the computing system to access customer care data relating to general customer data and AR/POS customer data from ABS legacy systems and generate a graphical user interface presenting the customer care data;
   a collection of internet browser application functions including hyperlinks, push buttons, page forward and page backward functions included in said AR/POS application; and
   where said ARIPOS application of said customer care computing system provides the graphical user interface operable to handle counter sales, orders, order tracking, and billing information utilizing an integrated group of data repositories which define an element of a graphical interface and a function of the element and where said integrated group of data repositories includes a user interface (UI) repository, a data binding repository and a screen repository where said repositories are linked to various object oriented applications executed at runtime of the AR/POS application thereby performing data binding, field definition and screen arrangement in order to provide the AR/POS graphical user interface.

2. The system for providing an AR/POS graphical user interface as recited in claim 1 where the ABS legacy systems include an account payable system, a general ledger system, and a material inventory system.

3. The system as recited in claim 1 where the billing handling function is operable to structure a consolidated bill having multiple invoices and agreements per financial account.

4. The system as recited in claim 1 where the ordering and counter sale handling functions are operable to handle returns, refund credit balances, and sales under reports.

5. A system for providing an AR/POS graphical user interface comprising:
   a customer care computing system having an executable ALRIPOS application operably stored thereon where said AR/POS application is operable to control the computing system to access customer care data relating to general customer data and AR/POS customer data from the ABS legacy systems and generate a graphical user interface having a navigation scheme operable to provide a single point of entry user interface where customer information and account information is continuously in view and having an integrated group of data repositories which define an element of a graphical interface and a function of the element and where said integrated group of data repositories including a user interface (UI) repository, a data binding repository and a screen repository where said repositories are linked to various object oriented applications executed at runtime of the AR/POS application thereby performing data binding, field definition and screen arrangement in order to provide the AR/POS graphical user interface.

6. The system for providing an AR/POS user interface as recited in claim 5 where the ABS legacy systems include an accounts payable system, a general ledge system, and a material inventory system, a purchase order system, a payroll system and a work order system.

7. The system as recited in claim 5 where the navigation scheme includes a main navigation tree, hyperlinks, push buttons, and browser-like page forward/page backward functionality.

8. A method for providing an AR/POS graphical user interface comprising the steps of:
   executing an AR/POS application on a customer care computing system where when executed generates a graphical user interface single point of entry for accessing customer care data relating to general customer data and AR/POS customer data from the ABS legacy systems communicable with the customer care computing system;
   receiving a screen request initiated from a user input;
   navigating to a screen based on the user input and displaying the screen having user interface elements relating to general customer data and customer AR/POS data, including order processing, order tracking, counter sales, and billing;
   accessing an integrated group of data repositories which define the elements of the graphical user interface and the elements functions;
   said integrated group of data repositories including a user interface (UI) repository, a data binding repository and a screen repository where said repositories are linked to various object oriented applications executed at runtime of the AR/POS application thereby performing data binding, field definition and screen arrangement in order to provide the AR/POS graphical user interface; and
   maintaining a customer centric interface environment where the AR/POS application provides retrieval schemes, display schemes and grouping of information schemes related to a customer in view.

9. The method as recited in claim 8 where the graphical user interface is operable to access the ABS legacy systems including accounts payable systems, general ledger systems, material inventory systems, purchase order systems, payroll systems, and work order systems.

10. The method as recited in claim 8 where receiving a screen request initiated from a user input includes inputs relating to hyperlinks and browser-like page forward and page backward functions.

11. A method for providing an AR/POS graphical user interface comprising the steps of:
    executing an AR/POS application on a customer care computing system where when executed generates a graphical user interface single point of entry for accessing customer care data relating to general customer data and AR/POS customer data from the ABS legacy systems communicable with the customer care computing system;
    providing with the executing AR/POS application a collection of internet browser application functions including hyperlinks, push buttons, page forward and page backward;
    receiving a screen request initiated from one of the internet browser application functions;
    accessing an integrated group of data repositories which define elements of the graphical user interface and the elements functions;
    said integrated group of data repositories including a user interface (UI) repository, a data binding repository and a screen repository where said repositories are linked to various object oriented applications executed at runtime of the AR/POS application thereby performing data binding, field definition and screen arrangement in order to provide the AR/POS graphical user interface; and maintaining a customer centric interface environment where the AR/POS application provides retrieval schemes, display schemes and grouping of information schemes related to a customer in view.

12. The method for providing an AR/POS graphical user interface as recited in claim 11, where maintaining the customer centric interface environment includes maintaining the customer continuously in view and providing direct access to all information and accounts relating to the customer.

13. The method as recited in claim 11, where executing the AR/POS application operable for accessing the ABS legacy systems includes accessing Accounts Payables Legacy systems, General Ledger Legacy systems, Material Inventory Legacy Systems, Purchase Order Systems, Payroll Systems, and Work Order Systems.

14. The method as recited in claim 11, further comprising:
providing with the executed AR/POS application a work product set aside function.

15. A method for providing a computing system for presenting an AR/POS graphical user interface comprising the steps of:

presenting a customer care graphical user interface screen having a navigation tree, a plurality of fields relating to AR/POS customer data originating from the ABS legacy systems, and a collection of internet browser-like application functions selectable by a user including hyperlink, page forward, page backward and push buttons functions;

accessing an integrated group of data repositories which define elements of the graphical user interface and the elements functions where said integrated group of data repositories includes a user interface (UI) repository, a data binding repository and a screen repository where said repositories are linked to various object oriented applications executed at runtime of the AR/POS application thereby performing data binding, field definition and screen arrangement in order to provide the AR/POS graphical user interface;

presenting a new customer care graphical user interface screen with updated fields relating to AR/POS customer data responsive to a user input; and presenting the customer care AR/POS customer data in a customer centric manner providing selections for customer related information including selections for all customer accounts for a customer in view.

16. The method for providing a computing system for presenting an AR/POS graphical user interface as recited in claim 15, further comprising:
presenting a customer care graphical user interface screen having a notepad and alert function.

* * * * *

UNITED STATES PATENT AND TRADEMARK OFFICE
CERTIFICATE OF CORRECTION

PATENT NO.       : 7,571,113 B2
APPLICATION NO.  : 10/708013
DATED            : August 4, 2009
INVENTOR(S)      : Brian K. Fettig et al.

It is certified that error appears in the above-identified patent and that said Letters Patent is hereby corrected as shown below:

In Col. 3, line 27, delete "invoice$^5$" and replace with -- invoices --

In Col. 4, line 2, delete "objectoriented" and replace with -- object-oriented --

In Col. 5, line 33, delete "java" and replace with -- Java --

In Col. 7, line 10, delete "jump-To" and replace with -- Jump-To --

In Col. 19, line 60, delete "jump" and replace with -- Jump --

In Claim 1, Col. 21, line 9, delete "compnsrising" and replace with -- comprising --

In Claim 1, Col. 21, line 21, delete "ARIPOS" and replace with -- AR/POS --

In Claim 2, Col. 21, line 36, delete "account" and replace with -- accounts --

In Claim 5, Col. 21, line 48, delete "ARLIPOS" and replace with -- AR/POS --

Signed and Sealed this

Twenty-fourth Day of November, 2009

David J. Kappos
*Director of the United States Patent and Trademark Office*